United States Patent [19]
Chesley et al.

[11] Patent Number: 5,785,784
[45] Date of Patent: Jul. 28, 1998

[54] ABRASIVE ARTICLES METHOD OF MAKING SAME AND ABRADING APPARATUS

[75] Inventors: Jason A. Chesley, Hudson, Wis.; William L. Melbye, Woodbury, Minn.

[73] Assignee: Minnesota Mining and Manufacturing Company, St. Paul, Minn.

[21] Appl. No.: 898,906

[22] Filed: Jul. 23, 1997

Related U.S. Application Data

[63] Continuation of Ser. No. 372,106, Jan. 13, 1995, abandoned, which is a continuation-in-part of Ser. No. 181,192, Jan. 13, 1994, abandoned, Ser. No. 181,193, Jan. 13, 1994, Pat. No. 5,505,747, and Ser. No. 181,195, Jan. 13, 1994, Pat. No. 5,607,345.

[51] Int. Cl.$^6$ .................. B24D 11/00; B32B 31/28
[52] U.S. Cl. .................. 156/66; 156/231; 156/232; 156/275.5; 51/297
[58] Field of Search .................. 156/66, 72, 231, 156/232, 245, 246, 275.5; 51/295, 297, 298

[56] References Cited

U.S. PATENT DOCUMENTS

| | | |
|---|---|---|
| 2,717,437 | 9/1955 | De Mestral . |
| 2,958,593 | 11/1960 | Hoover et al. . |
| 3,009,235 | 11/1961 | De Mestral . |
| 3,027,595 | 4/1962 | Takai et al. . |
| 3,138,841 | 6/1964 | Naimer . |
| 3,147,528 | 9/1964 | Erb . |
| 3,192,589 | 7/1965 | Pearson . |
| 3,235,438 | 2/1966 | Wisotzky . |
| 3,270,408 | 9/1966 | Nealis . |
| 3,312,583 | 4/1967 | Rochlis . |
| 3,320,649 | 5/1967 | Naimer . |
| 3,353,663 | 11/1967 | Kayser et al. . |
| 3,408,705 | 11/1968 | Kayser et al. . |

(List continued on next page.)

FOREIGN PATENT DOCUMENTS

| | | |
|---|---|---|
| 0 109 851 B1 | 5/1984 | European Pat. Off. . |
| 0 112 405 A1 | 7/1984 | European Pat. Off. . |
| 0 211 564 | 2/1987 | European Pat. Off. . |
| 0 258 015 | 3/1988 | European Pat. Off. . |
| 0 276 970 | 8/1988 | European Pat. Off. . |
| 0 278 866 | 8/1988 | European Pat. Off. . |
| 0 306 161 A2 | 3/1989 | European Pat. Off. . |
| 0 306 162 A2 | 3/1989 | European Pat. Off. . |
| 0 319 249 | 6/1989 | European Pat. Off. . |
| 0 325 528 A1 | 7/1989 | European Pat. Off. . |
| 0 341 993 A1 | 11/1989 | European Pat. Off. . |
| 0 554 668 A1 | 8/1993 | European Pat. Off. . |
| 0 575 828 A1 | 12/1993 | European Pat. Off. . |
| 0 578 865 | 1/1994 | European Pat. Off. . |

(List continued on next page.)

OTHER PUBLICATIONS

Dominick V. Rosato, PE and Donald V. Rosato, PhD (eds), *Injection Molding Handbook*, pp. 504–506, 596, 619–621, 752–754, and 756; Van Nostrand Reinhold Company, New York, 1986.

*Primary Examiner*—Daniel Stemmer
*Attorney, Agent, or Firm*—James J. Trussell

[57] ABSTRACT

An abrasive sheet article is disclosed, including a substrate having first and second major surfaces, a coated abrasive on the first major surface, and a plurality of hooking stems on the second major surface. The coated abrasive may comprise a plurality of precisely shaped composites comprising a plurality of abrasive grains dispersed in a binder. The hooking stems are adapted to hook engaging structures on an opposed surface to releasably affix the abrasive sheet member to the surface. A method for making such abrasive articles is also disclosed, including several illustrative variations of the inventive method. Also disclosed is a back-up pad for supporting such an abrasive article during abrading. The back-up pad includes a support portion, such as a polymeric backing, and an engaging portion, such as a loop material, for engaging hooking stems projecting from the abrasive article.

43 Claims, 10 Drawing Sheets

U.S. PATENT DOCUMENTS

| | | |
|---|---|---|
| 3,490,107 | 1/1970 | Brumlik . |
| 3,494,006 | 2/1970 | Brumlik . |
| 3,522,637 | 8/1970 | Brumlik . |
| 3,555,601 | 1/1971 | Price . |
| 3,594,863 | 7/1971 | Erb . |
| 3,594,865 | 7/1971 | Erb . |
| 3,708,833 | 1/1973 | Ribich et al. . |
| 3,718,725 | 2/1973 | Hamano . |
| 3,762,000 | 10/1973 | Menzin et al. . |
| 3,773,580 | 11/1973 | Provost . |
| 3,849,840 | 11/1974 | Yamada et al. . |
| 3,849,949 | 11/1974 | Steinhauser et al. . |
| 3,863,304 | 2/1975 | Brumlik . |
| 3,913,183 | 10/1975 | Brumlik . |
| 4,024,003 | 5/1977 | Buhler . |
| 4,056,593 | 11/1977 | de Navas Albareda . |
| 4,064,018 | 12/1977 | Choi . |
| 4,147,580 | 4/1979 | Buell . |
| 4,169,303 | 10/1979 | Lemelson . |
| 4,184,291 | 1/1980 | Marton . |
| 4,216,257 | 8/1980 | Schams et al. . |
| 4,263,755 | 4/1981 | Globus . |
| 4,287,685 | 9/1981 | Marton . |
| 4,290,174 | 9/1981 | Kalleberg . |
| 4,290,832 | 9/1981 | Kalleberg . |
| 4,311,489 | 1/1982 | Kressner . |
| 4,315,885 | 2/1982 | Lemelson . |
| 4,322,875 | 4/1982 | Brown et al. . |
| 4,410,327 | 10/1983 | Baggaley . |
| 4,437,269 | 3/1984 | Shaw . |
| 4,454,183 | 6/1984 | Wollman . |
| 4,563,380 | 1/1986 | Black et al. . |
| 4,609,581 | 9/1986 | Ott . |
| 4,644,703 | 2/1987 | Kaczmarek et al. ............... 51/401 |
| 4,652,274 | 3/1987 | Boettcher et al. . |
| 4,652,275 | 3/1987 | Bloecher et al. . |
| 4,653,582 | 3/1987 | Ehrenfried . |
| 4,665,909 | 5/1987 | Trainor . |
| 4,699,622 | 10/1987 | Toussant et al. . |
| 4,706,914 | 11/1987 | Ground . |
| 4,707,893 | 11/1987 | Hashizume et al. . |
| 4,710,414 | 12/1987 | Northrup et al. . |
| 4,735,632 | 4/1988 | Oxman et al. . |
| 4,751,138 | 6/1988 | Tumey et al. . |
| 4,761,318 | 8/1988 | Ott et al. ........................... 428/85 |
| 4,775,310 | 10/1988 | Fischer ............................. 425/308 |
| 4,784,890 | 11/1988 | Black . |
| 4,799,939 | 1/1989 | Bloecher et al. . |
| 4,814,036 | 3/1989 | Hatch . |
| 4,819,309 | 4/1989 | Behymer . |
| 4,822,658 | 4/1989 | Pacione . |
| 4,870,725 | 10/1989 | Dubowik . |
| 4,872,243 | 10/1989 | Fischer . |
| 4,875,259 | 10/1989 | Appeldorn . |
| 4,881,997 | 11/1989 | Hatch . |
| 4,894,060 | 1/1990 | Nestegard . |
| 4,897,891 | 2/1990 | Kallman et al. . |
| 4,903,440 | 2/1990 | Larson et al. . |
| 4,910,062 | 3/1990 | Zinke et al. . |
| 4,931,343 | 6/1990 | Becker et al. . |
| 4,933,224 | 6/1990 | Hatch . |
| 4,959,265 | 9/1990 | Wood et al. . |
| 4,974,384 | 12/1990 | Pacione . |
| 4,984,339 | 1/1991 | Provost et al. ..................... 24/452 |
| 4,985,340 | 1/1991 | Palazzotto et al. . |
| 5,032,122 | 7/1991 | Noel et al. . |
| 5,040,275 | 8/1991 | Eckhardt et al. . |
| 5,042,221 | 8/1991 | Pacione . |
| 5,054,245 | 10/1991 | Coty . |
| 5,056,933 | 10/1991 | Kamp . |
| 5,058,247 | 10/1991 | Thomas et al. ..................... 24/448 |
| 5,060,443 | 10/1991 | Pacione . |
| 5,061,294 | 10/1991 | Harmer et al. . |
| 5,066,444 | 11/1991 | Behr . |
| 5,067,210 | 11/1991 | Kayaki . |
| 5,067,822 | 11/1991 | Wirth et al. . |
| 5,077,870 | 1/1992 | Melbye et al. . |
| 5,088,164 | 2/1992 | Wilson et al. . |
| 5,100,400 | 3/1992 | Mody et al. . |
| 5,107,626 | 4/1992 | Mucci ............................... 51/281 R |
| 5,110,649 | 5/1992 | Morse et al. . |
| 5,116,563 | 5/1992 | Thomas et al. .................... 264/167 |
| 5,133,166 | 7/1992 | Pacione . |
| 5,137,542 | 8/1992 | Buchanan et al. ................. 51/295 |
| 5,138,750 | 8/1992 | Gundlach et al. . |
| 5,144,786 | 9/1992 | Pacione . |
| 5,149,573 | 9/1992 | Kobe et al. . |
| 5,152,917 | 10/1992 | Pieper et al. ...................... 51/295 |
| 5,174,795 | 12/1992 | Wiand ................................ 51/295 |
| 5,175,965 | 1/1993 | Sanborn . |
| 5,180,618 | 1/1993 | Kessler et al. . |
| 5,191,692 | 3/1993 | Pacione . |
| 5,196,266 | 3/1993 | Lu et al. . |
| 5,201,101 | 4/1993 | Rouser et al. . |
| 5,201,147 | 4/1993 | Francis . |
| 5,201,149 | 4/1993 | Eisenblätter ....................... 51/394 |
| 5,203,884 | 4/1993 | Buchanan et al. . |
| 5,230,851 | 7/1993 | Thomas ............................. 264/145 |
| 5,231,803 | 8/1993 | Lanzer ............................... 51/325 |
| 5,236,472 | 8/1993 | Kirk et al. . |
| 5,242,646 | 9/1993 | Torigoe et al. . |
| 5,254,194 | 10/1993 | Ott et al. ........................... 156/176 |
| 5,318,741 | 6/1994 | Thomas ............................. 264/519 |
| 5,435,816 | 7/1995 | Spurgeon .......................... 51/295 |
| 5,505,747 | 4/1996 | Chesley ............................. 51/297 |

FOREIGN PATENT DOCUMENTS

| | | |
|---|---|---|
| 1.383.501 | 11/1964 | France . |
| 1.513.722 | 1/1968 | France . |
| 2 101 195 | 3/1972 | France . |
| 2 364 004 | 4/1978 | France . |
| 32 44 410 A1 | 10/1983 | Germany . |
| 3301 210 A1 | 7/1984 | Germany . |
| OS 39 03 204 | 2/1990 | Germany . |
| 42 41 908 | 6/1993 | Germany . |
| SHO 49-38734 | 4/1974 | Japan . |
| SHO 53-22501 | 3/1978 | Japan . |
| 61-215766 | 9/1986 | Japan . |
| 61-255607 | 11/1986 | Japan . |
| 339155 | 8/1959 | Switzerland . |
| 1199940 | 7/1970 | United Kingdom . |
| 1205267 | 9/1970 | United Kingdom . |
| WO 86/03164 | 6/1986 | WIPO . |
| WO 87/06522 | 5/1987 | WIPO . |
| WO 92/01401 | 2/1992 | WIPO . |
| WO 93/03644 | 3/1993 | WIPO . |
| WO 93/03889 | 3/1993 | WIPO . |
| WO 93/20976 | 10/1993 | WIPO . |
| WO 94/23610 | 10/1994 | WIPO . |

Fig. 8

| | Loop Material | Head diameter (mm) | Stem diameter (mm) | Head overhang (mm) | Hooking Stem Density (stems per square cm) | Hooking Stem Overall Height (mm) | Grade: Mode 1 | Grade: Mode 2 | Grade: Mode 3 | Overall Evaluation |
|---|---|---|---|---|---|---|---|---|---|---|
| Example 4 | GM | 0.762 | 0.508 | 0.127 | 35 | 0.559 | 5 | 5 | 5 | above average |
| Example 5 | GM | 0.762 | 0.508 | 0.127 | 62 | 1.041 | 5 | 5 | 3 | average |
| Example 6 | GM | 0.749 | 0.508 | 0.121 | 62 | 0.902 | 5 | 5 | 5 | above average |
| Example 7 | GM | 0.749 | 0.508 | 0.121 | 62 | 0.927 | 5 | 5 | 5 | above average |
| Example 8 | KA | 0.749 | 0.508 | 0.121 | 62 | 0.927 | 5 | 5 | 5 | above average |
| Example 9 | KK | 0.749 | 0.508 | 0.121 | 62 | 0.927 | 5 | 5 | 2 | unacceptable |
| Example 10 | GM | 0.610 | 0.381 | 0.114 | 97 | 0.584 | 5 | 5 | 4 | above average |
| Example 11 | KA | 0.610 | 0.381 | 0.114 | 97 | 0.584 | 5 | 4 | 2 | unacceptable |
| Example 12 | KK | 0.610 | 0.381 | 0.114 | 97 | 0.584 | 5 | 4 | 2 | unacceptable |
| Example 13 | GM | 0.699 | 0.508 | 0.95 | 62 | 1.448 | 5 | 5 | 2 | unacceptable |
| Example 14 | KA | 0.699 | 0.508 | 0.95 | 62 | 1.448 | 5 | 4 | 2 | unacceptable |
| Example 15 | KK | 0.699 | 0.508 | 0.95 | 62 | 1.448 | 5 | 2 | 2 | unacceptable |
| Example 16 | GM | 0.991 | 0.635 | 0.178 | 62 | 0.927 | 5 | 5 | 5 | above average |
| Example 17 | KA | 0.991 | 0.635 | 0.178 | 62 | 0.927 | 5 | 5 | 2 | unacceptable |
| Example 18 | GM | 0.737 | 0.508 | 0.114 | 35 | 0.546 | 5 | 5 | 3 | average |
| Example 19 | GM | 0.737 | 0.508 | 0.114 | 62 | 0.991 | 5 | 5 | 5 | above average |
| Example 20 | KA | 0.737 | 0.508 | 0.114 | 35 | 0.546 | 5 | 2 | 2 | unacceptable |
| Example 21 | KK | 0.737 | 0.508 | 0.114 | 62 | 0.546 | 5 | 5 | 2 | unacceptable |
| Example 22 | GM | 0.737 | 0.381 | 0.178 | 35 | 0.546 | 5 | 5 | 4 | above average |

| | Loop Material | Head diameter (mm) | Stem diameter (mm) | Head overhang (mm) | Hooking Stem Density (stems per square cm) | Hooking Stem Overall Height (mm) | Grade: Mode 1 | Grade: Mode 2 | Grade: Mode 3 | Overall Evaluation |
|---|---|---|---|---|---|---|---|---|---|---|
| Example 23 | GNN | 0.36 | 0.20 | 0.16 | 248 | 0.58 | 5 | 5 | 2 | unacceptable |
| Example 24 | KK | 0.36 | 0.20 | 0.16 | 248 | 1.58 | 5 | 2 | 2 | unacceptable |
| Example 25 | W | 0.66 | 0.38 | 0.28 | 35 | 1.0 | 5 | 5 | 5 | above average |
| Example 26 | W | 0.60 | 0.38 | 0.22 | 50 | 1.0 | 5 | 5 | 2 | unacceptable |
| Example 27 | W | 0.56 | 0.38 | 0.18 | 66 | 0.76 | 5 | 5 | 3 | average |

Fig. 8A

ABRASIVE ARTICLES METHOD OF MAKING SAME AND ABRADING APPARATUS

This is a continuation of application Ser. No. 08/372,106 filed Jan. 13, 1995 now abandoned, which is a continuation-in-part of U.S. patent application Ser. No. 08/181,192, "Abrasive Article," filed Jan. 13, 1994, now abandoned; U.S. patent application Ser. No. 08/181,193, "Method of Making an Abrasive Article," filed Jan. 13, 1994, now U.S. Pat. No. 5,505,747; and U.S. patent application Ser. No. 08/181,195, "Abrading Apparatus," filed Jan. 13, 1994, now U.S. Pat. No. 5,607,345. The disclosures of these three applications are incorporated herein by reference.

TECHNICAL FIELD

The invention relates to a coated abrasive article, such as an abrasive disc or an abrasive sheet, and a method of making such an abrasive article. The present invention also relates to an abrading apparatus and particularly to a back-up pad for supporting an abrasive article.

BACKGROUND OF THE INVENTION

Abrasive articles are used in a variety of fields for abrading material from a surface of a workpiece. For example, an abrasive disc may be releasably mounted on a back-up pad for rotative movement by a random orbital sander. When the disc is rotated, and the exposed abrasive surface of the disc is urged against the workpiece surface, material may be removed from the workpiece. This operation may be desirable for surface refinement purposes, or for the removal of excess material from the workpiece.

Abrasive discs are typically releasably attached to a back-up pad, which supports the abrasive disc during the abrading process. The back-up pad includes a generally planar major surface, to which the abrasive article, such as a disc or sheet, may be attached. Although back-up pads may be hand held, back-up pads are more commonly used in conjunction with powered abrading apparatuses, such as electric or pneumatic sanders.

Several types of abrasive discs have some type of attachment system incorporated into the disc to enable the disc to be releasably attached to a back-up pad. Three such abrasive discs that are relevant to the present invention—discs with pressure sensitive adhesive, textile materials, and stalks, respectively—are described seriatim below.

Abrasive discs having a layer of pressure sensitive adhesive ("PSA") on the back surface (the surface opposite the abrasive surface) are typically made by applying a layer of pressure sensitive adhesive on the back surface of the disc. One method used to produce these PSA abrasive discs is described in U.S. Pat. No. 3,849,949 (Steinhauser et al.), wherein adhesives such as vinyl ethers, acrylates, rubber resins, acrylic copolymers (such as a 95.5:4.5 isooctylacrylate:acrylic acid copolymer) are coated onto an abrasive sheet. The PSA is then dried or cooled, such that it is tacky but not flowable. The PSA adheres the disc to the back-up pad, and is sufficiently aggressive to prevent displacement of the abrasive article with respect to the back-up pad during use. The major surface of the back-up pad may have, for example, a smooth foam, vinyl, or cloth surface to facilitate attachment of the abrasive disc. An example of such a back-up pad is available from the Minnesota Mining and Manufacturing Company of St. Paul, Minn. under the designation Stikit™ brand back-up pad. Furthermore, the PSA permits the abrasive article to be peeled away from the back-up pad relatively easily, such that a new abrasive disc may be applied to the back-up pad with a minimum of time and effort.

Although they have certain benefits, PSA abrasive discs also have some limitations. For example, the PSA layer thickness (known in the processing field as the "coating weight") is often critical to the performance of the PSA abrasive disc, and precise control of the coating weight may be difficult to obtain by conventional coating methods. Furthermore, uniformity of PSA coating is also important to adhesion, and may be similarly difficult to obtain. Non-uniform PSA coating can lead to lack of adhesion (where PSA coating weight is reduced) or bumps in the surface of the abrasive disc (where PSA coating weight is increased). Another potential shortcoming is that the PSA can be too aggressive in its adhesion to the back-up pad, such that the operator may be unable to remove all of the abrasive article from the back-up pad. If pieces of the disc backing or areas of PSA, or both, are left on the back-up pad, the resultant buildup can cause high spots on the back-up pad and present an uneven and unbalanced operating surface for receipt of a new abrasive disc. This unevenness may leave undesirable streaks or marks on the surface being abraded. Another potential deficiency of the PSA back-up pad is that when PSA from the abrasive article remains on the back-up pad, the PSA can become contaminated with dust and debris, resulting in a "dead" spot onto which a new disc will not adhere, or an uneven surface that can tend to leave wild scratches in the workpiece. Thus, back-up pads adapted for receipt of a pressure sensitive adhesive backed abrasive disc may be undesirable. Another potential deficiency of the PSA abrasive disc is that the disc is intended for only a single use, because the PSA layer becomes easily contaminated with dust and debris when it has been detached from the back-up pad. When the PSA layer has been contaminated, reattachment to the back-up pad is difficult or impossible, and a new disc must be provided. This single use characteristic thus can be wasteful, because an abrasive disc may have to be discarded before the abrasive surface has worn out.

A second type of abrasive disc, referred to herein as the "textile" disc, includes a textile loop material on the back surface of the abrasive article opposite the abrasive surface. The textile material can be, for example, woven or non-woven web, brushed nylon, brushed polyester, knitted fabrics, and stitch-bonded fabrics. Textile discs are described in U.S. Pat. Nos. 4,437,269 (Shaw) and 4,609,581 (Ott), and an example of a textile abrasive disc is available from the Minnesota Mining and Manufacturing Company of St. Paul, Minn. under the designation Hookit™ discs. Textile discs are typically used in conjunction with a back-up pad having a plurality of engaging members that are bonded to the attachment surface of the back-up pad. The engaging members on the back-up pad are designed to engage the textile material of the textile disc, to secure the abrasive disc to the back-up pad.

The method of making a textile abrasive disc generally includes the steps of providing a loop material (such as a brushed nylon material available from Guilford Mills, Inc., of Greensboro, N.C. under the designation 33295), and laminating the loop material to an abrasive sheet using a suitable (for the textile or abrasive sheet member) water-based, solvent-based, or 100% solids hot-melt adhesive. The laminating adhesive is normally roll coated, sprayed, or extruded onto the abrasive sheet backing, and the loop material is then applied to the adhesive surface.

Textile abrasive discs overcome some of the disadvantages associated with PSA discs. For example, textile abrasive discs may be removed from and reattached to the back-up pad several times, even if the textile material is exposed to dust or dirt. Thus, textile discs may be used several times before they must be discarded. Also, the textile material does not leave any adhesive residue on the back-up pad.

Textile abrasive discs, however, also exhibit some disadvantages. For example, textile discs can shift relative to the back-up pad during use, especially when the textile is a low weight material. Also, if the textile material is damaged during disengagement from the back-up pad, the disc may be limited to a single use. Furthermore, fibers from the textile material tend to come loose from the abrasive disc, which can clog the engaging members on the back-up pad and thereby decrease the useful life of the back-up pad. The loose fibers may also become airborne, which is undesirable in some environments where, for example, surfaces prepared for painting or freshly painted surfaces are present. Also, when textile abrasive discs are stacked (for handling during packaging, for example) the abrasive grains of one disc can snag the textile material on an adjacent disc, rendering the abrasive discs difficult to separate. Textile abrasive discs are also typically more expensive to manufacture than PSA discs.

Certain disadvantages are also evident with the method of producing textile discs. For example, suitable textiles are generally expensive, especially when compared to pressure sensitive adhesives. Also, the textile material often requires an added brushing step to provide a sufficient number of loops in an upright position to facilitate adequate attachment. Furthermore, the converting of textile-backed abrasive members to disc form requires unique equipment, such as high pressure presses and special handling apparatuses to collate the cut abrasive discs properly for packaging. Placement of the textile material onto the adhesive surface of an abrasive sheet may also be problematical, because the textile must be maintained in correct alignment with the adhesive-applied abrasive sheet member to prevent wrinkles in either the textile or abrasive sheet member.

U.S. Pat. No. 4,437,269 (Shaw) relates primarily to textile discs of the type described above, but also briefly discusses a final type of disc referred to herein as the "stalk" disc. Specifically, the '269 patent discloses a back-up pad and a disc, wherein one of the two components has a textile material on one face, and "the other of the pad and the back of the disc ha[s] a layer thereon from which extend loop-engaging or curl-engaging members in the form of monofilament stalks having unhooked ends." See column 2, lines 55 through 58 of the '269 patent. The stalks project from a backing, and slidingly intermesh with, but do not hook, a loop-like textile material on an opposed surface to attach the two surfaces together.

The abrasive disc of the '269 patent, with one side including stalks having unhooked ends, also may not perform acceptably under some circumstances. For example, it may be desirable for an abrasive disc to exhibit a certain minimum level of peel adhesion force, which may be difficult to attain using a structure such as that shown in the '269 patent.

The method used to produce stalk discs also has certain disadvantages. The method used to make stalk discs generally involves a knitting process (such as warp knitting), that produces a woven base layer formed from multifilament yarn. Spaced stalks are woven into the knitted base layer, and are inclined with respect to, and project away from, the base layer. The woven stalk material may then be laminated to an abrasive sheet to produce an abrasive article. The raw materials used to make stalk discs are more expensive than, for example, pressure sensitive adhesive materials. Other difficulties may arise during the converting process, such as damage to the stalks, lamination problems due to handling of the stalk fabric, and the like.

German patent DE 4 241 908, assigned to Dualflex Company, Ltd. of Ontario, Canada, discloses a back-up pad having a velvet-like material thereon. The material comprises individual fibers, some of which are connected to the back-up pad at only one end, and others which are connected to the back-up pad at both ends to form loops. This back-up pad is used with a tough, non-hardening adhesive to hold an abrasive article thereon. This back-up pad can suffer from the same deficiencies as the back-up pad used with a PSA disc, above, and may thus be undesirable.

In view of the disadvantages associated with the various abrasive discs and back-up pads of the prior art, it is desirable to provide an abrasive disc that is relatively inexpensive, reusable, easily and securely attached to a back-up pad, and easily removed from the back-up pad for replacement. It is also desirable to provide a method of making such an abrasive disc that overcomes those disadvantages. It is also desirable to provide a back-up pad for use with an abrasive article that overcome the disadvantages of the prior art.

SUMMARY OF THE INVENTION

The present invention includes an abrasive article for releasable affixation to a mating surface having engaging structures. The abrasive article comprises a substrate having first and second major surfaces, abrasive means disposed on the first surface, and a plurality of hooking stems affixed to and projecting from the second surface. The hooking stems each include means for hooking the engaging structures of the mating surface to releasably affix the abrasive article to the mating surface. In one variation, the abrasive means is a structured abrasive bonded directly to the first major surface of the substrate.

In one embodiment, the hooking stems of the abrasive article each have a head attached to the stem, with the head extending radially beyond the periphery of said stem in at least one direction. The heads are adapted for hooking the engaging structures to releasably affix the abrasive article to the mating surface.

In another embodiment, the hooking stems of the abrasive article each have an included distal end angle, as defined herein, of less than approximately 90 degrees. The hooking stems so provided hook the engaging structures to releasably affix the abrasive article to the mating surface.

The present invention also includes a method of making an abrasive article, including the steps of providing an abrasive sheet having first and second major surfaces, the first major surface including means for abrading a surface; providing a plurality of projecting stems on said second surface; and providing each stem with a hooking portion to enable the hooking stem to releasably hook an opposed engaging structure.

In another embodiment, the method comprises the steps of providing an abrasive sheet having first and second major surfaces, the first major surface including means for abrading a surface; molding a base sheet having opposed first and second major surfaces, and a plurality of stems projecting from the first major surface; bonding the second major surface of the base sheet to the second major surface of the abrasive sheet; and providing each stem with a hooking portion to enable the hooking stem to releasably hook an opposed engaging structure.

In another embodiment, the method comprises the steps of providing an abrasive sheet having first and second major surfaces, the first major surface including means for abrading a surface; providing a plurality of stems projecting from the second major surface by the application of a flowable material with a gravure roll; and providing each stem with a hooking portion to enable the hooking stem to releasably hook an opposed engaging structure.

In yet another embodiment, the method includes the steps of providing an abrasive sheet having first and second major surfaces, the first major surface including means for abrading a surface; extruding a flowable material through a die opening adapted to provide a base sheet having a plurality of parallel rail members projecting therefrom; severing the rail members transverse to the longitudinal axis of the rail members; stretching the base sheet to space the severed portions of the respective rail members to provide hooking stems; and bonding the base sheet to the abrasive sheet to provide the abrasive article.

In a further embodiment, the method includes the steps of providing a substrate having a first major surface and a second major surface, wherein said second major surface includes a plurality of hooking stems; providing a production tool having a contact surface, wherein said contact surface comprises a plurality of cavities; applying an abrasive coating precursor including a binder and a plurality of abrasive particles onto one of said contact surface of said production tool and said first major surface of said substrate; contacting said first major surface of said substrate with said contact surface of said production tool; exposing said abrasive coating precursor to conditions such that said abrasive coating precursor is at least partially cured to form an abrasive coating adhered to said first major surface, wherein said abrasive coating comprises a plurality of abrasive composites having a precise shape imparted by said cavities; and separating said coated abrasive article from said production tool.

The present invention also provides an abrading apparatus comprising a back-up pad, including a support member having a major surface, and an engaging surface adjoining said major surface, the engaging surface comprising means for engaging projecting hooking stems, and an abrasive article, including a substrate having first and second major surfaces, the first major surface including means for abrading a work surface, and the second major surface including hooking stems for releasably engaging the loop members of the back-up pad.

Also provided is an abrading apparatus for use with an abrasive article having a plurality of hooking stems projecting from a surface thereof, comprising a back-up pad including a support portion having a major surface, and a plurality of hooking stems adjoining and projecting from the major surface, and a conversion pad releasably attached to the major surface, including first and second opposed pad surfaces, the first pad surface including an engaging surface for releasably engaging the hooking stems projecting from the major surface of the back-up pad, and the second pad surface including an engaging surface for releasably engaging hooking stems projecting from the abrasive article.

BRIEF DESCRIPTION OF THE DRAWINGS

The present invention will be further explained with reference to the appended Figures, wherein like structure is referred to by like numerals throughout the several views, and wherein:

FIGS. 8 and 8(A) are tabular summaries of the results of Examples 4–27;

DETAILED DESCRIPTION OF THE INVENTION

Figure 1:
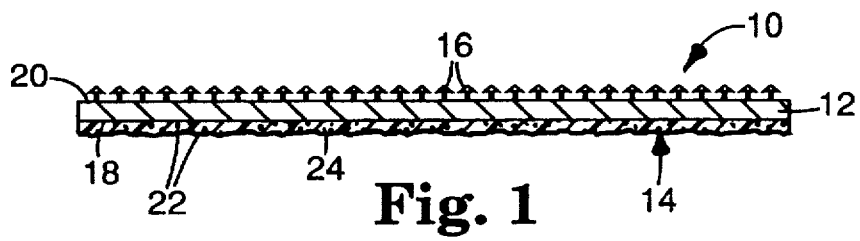
FIG. 1 is a sectional view of an abrasive article according to the present invention.

The present invention provides an abrasive article having hooking stems on one major surface thereof and a method for making such an abrasive article.

With regard to the abrasive article of the present invention, reference is made to FIGS. 1 through 4. Although illustrated herein as being circular and flat, the abrasive article of the present invention could have any desired shape, including but not limited to a circle, an oval, a polygon (such as a rectangle, square, or a star), or a multi-lobed shape (such as a daisy). Abrasive disc 10 includes substrate 12, abrasive surface 14, and hooking stems 16, each of which will be described in greater detail below. Substrate 12 has first and second major surfaces 18 and 20. First major surface 18 includes abrasive means 14 for abrading a surface, which are shown in the illustrated embodiment as abrasive particles 22 dispersed within bonding layer 24. The second major surface 20 includes a plurality of hooking stems 16, each of which includes hooking means for hooking engaging structures of an opposed surface.

The method of making an abrasive article according to the present invention, which will be described in greater detail below, generally includes the steps of providing an abrasive substrate having first and second major surfaces, the first major surface including means for abrading a surface, providing a plurality of stems adjacent and projecting from said second surface, and providing each stem with a hooking portion to enable the hooking stem to releasably hook an opposed engaging structure.

The back-up pad of the present invention, which will be described in greater detail below, includes a major surface, also referred to as the front surface, which is adapted to releasably engage with hooking stems that project from an abrasive article, such as a disc or sheet. The abrasive article is supported by the back-up pad for use in abrading the surface of a workpiece.

The substrate 12 of the present invention may comprise one or more of several different materials, including but not limited to fabric or cloth, paper, polymeric film, vulcanized fiber, woven or nonwoven webs, and treated versions, or combinations thereof. It is specifically contemplated that the substrate of the abrasive article may comprise an abrasive sheet laminated to a base sheet, as described further hereinafter. A preferred substrate is a primed polyester film, which is available from the Imperial Chemical Industries Americas Inc., of Wilmington, Del. under the designation ICI-475 film.

First major surface 18 of substrate 12 includes means for abrading a surface. In the illustrated embodiment, abrasive means is shown as abrasive particles 22 that are bonded to the first major surface 18 by a bonding material 24. The abrasive particles can include, but are not limited to, garnet, emery, aluminum oxide, cubic boron nitride, silicon carbide, alumina-zirconia, diamond, ceramic aluminum oxide, and combinations thereof. Typical bonding materials include animal glue and synthetic resins. Materials such as grinding aids, fillers, dyes, pigments, fibers, lubricants, surfactants, antistatic agents, coupling agents, plasticizers, and suspending agents may also be added to the abrasive materials.

In the abrasive articles and methods of manufacture described herein, an abrasive means—typically in the form of abrasive particles—is disposed on a surface of an abrasive sheet. The application of abrasive particles to a surface is known in the art, and will be described only briefly herein. One method of providing an abrasive on a sheet to form an abrasive sheet 100 involves coating an abrasive slurry, comprising abrasive particles dispersed in a resin, onto the sheet. The abrasive slurry can be applied by any conventional technique such as roll coating, die coating, spraying, knife coating, and the like. After coating the abrasive slurry, the resulting article is exposed to conditions (e.g. heat, radiation, or the passage of time) sufficient to cure the resin and form a cured binder. This results in the abrasive slurry being converted into an abrasive composite that is bonded to the abrasive sheet 100.

In a second method of applying an abrasive to an abrasive sheet to form an abrasive sheet 100, a make coat resin is coated by any conventional technique onto a sheet member. A plurality of abrasive particles is then applied into the make coat resin and the make coat resin is at least partially cured. Next, a size coat resin is applied over the abrasive particles and make coat. Finally the size resin and make coat resin are cured to form make and size coat binders. In a variation of this method, the make coat-resin may be partially cured prior to the application of the abrasive particles.

Nonwoven abrasive products incorporating abrasive grains may also be used as abrasive means in conjunction with the present invention. Nonwovens typically comprise an open porous lofty polymer filament structure (substrate) having the abrasive grains distributed throughout the fiber structure and bonded therein by an organic binder. Typical fibrous filaments structures applicable to such constructions comprise polyamides, polyesters, and polypropylene. Nonwoven abrasives are well known in the art—see, for example, U.S. Pat. No. 2,958,593 (Hoover et al.)—and thus will not be described further herein.

Hooking stems 16 are provided on second major surface 20, as shown in FIG. 1. As used herein, a hooking stem means a stem having 1) a free end that is spaced from the surface to which the stem is attached, and 2) structure that enables the hooking stem to releasably hook engaging structures provided on an opposed surface. Hooking stems 16 may be selected from among numerous different designs, some of which are shown and described herein. It should be understood that other hooking stem designs are comprehended by the present invention, though they are not specifically described below.

Each hooking stem is provided on and projects from the second surface 20. The hooking stems may be directly provided on the second surface 20 by being formed integrally with the second surface 20, or may be provided on an intermediate sheet or layer, which is affixed to the second surface. Stated differently, the individual hooking stems may or may not be directly bonded to the second surface 20. The hooking stems of the present invention may be provided on the second major surface in one of several ways. For example, the hooking stems may be formed from the same material as the substrate, such that the hooking stems are unitary with the substrate 12. Alternatively, the hooking stems may be affixed to the second major surface by, for example, an adhesive such as a hot-melt adhesive. In another embodiment, the hooking stems are formed from a separate sheet member (e.g. a plastic sheet), and the sheet member is affixed to the second major surface of the substrate. The separate sheet member may be bonded to the substrate directly (by ultrasonic bonding, for example), or by means of an adhesive. Other layers, including but not limited to an adhesive layer or a primer layer, may also be interposed between the hooking stems and the substrate.

Stem 28 may have any suitable cross-sectional shape, taken parallel to the substrate, including but not limited to a circle, an oval, a polygon (such as a star, a cross, a rectangle, or a parallelogram), or a multi-lobed shape (such as a daisy or a clover). The hooking stems may be solid or hollow, as desired, and the cross-sectional area of the hooking stem taken parallel to the second surface 20 is preferably within the range of 0.002 to 25 square millimeters (0.000004 to 0.04 square inches), more preferably between 0.01 and 1.0 square millimeters (0.000016 to 0.0016 inches), and most preferably between 0.05 and 0.45 square millimeters (0.00008 and 0.0007 square inches). These size ranges are for hooking stems that are adapted for interengagement with a durable loop material.

Figure 2A:
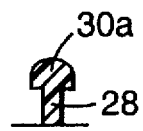
FIGS. 2(a) through 2(n) are sectional views of several embodiments of hooking stems according to the present invention.
Figure 2B:
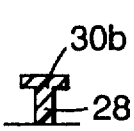
Figure 2C:
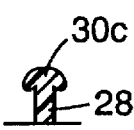
Figure 2D:
Figure 2E:
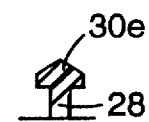
Figure 2F:
Figure 2G:
Figure 2H:
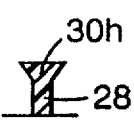
Figure 2I:
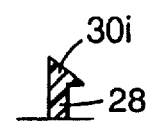
Figure 2J:
Figure 2K:
Figure 2L:
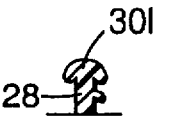
Figure 2M:
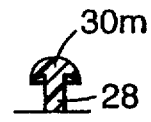
Figure 2N:
Figure 3A:
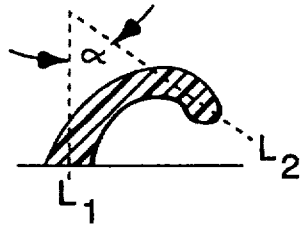
FIGS. 3(a) through 3(d) are sectional views of several additional embodiments of hooking stems according to the present invention.
Figure 3B:
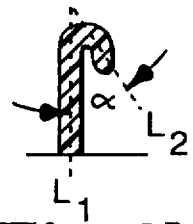
Figure 3C:
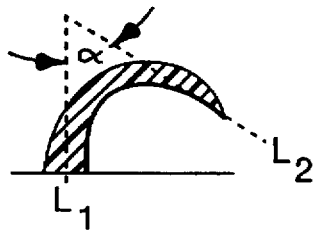
Figure 3D:
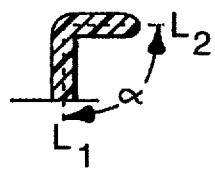

The maximum diameter of the stem, in the case of a cylindrical stem, is preferably between approximately 0.05 and 5.0 mm (0.002 and 0.20 in), more preferably between approximately 0.13 and 1.0 mm (0.005 and 0.04 in), and most The hooking stems discussed above also include means for hooking an engaging structure on an opposed surface (such as a loop material) to releasably affix the abrasive article to the opposed surface. In one embodiment, the hooking means is shown as at least one head 30 (shown as heads 30a through 30n in the illustrated embodiments) provided on each stem, as shown in the side views illustrated in FIGS. 2(a) through 2(n). Head 30 may also, or instead, be provided at other locations along stem 28, as shown in FIGS. 2(k) and 2(l), for example. A head, as used herein, means any structure that extends radially beyond the periphery of the stem in at least one direction.

Head 30 may have any suitable three-dimensional shape, such as, for example, a hemisphere, a sphere, a cube, a mushroom cap, a cylinder, a cone, a pyramid, a disc, or a barb. Some head designs thought to have utility in the context of the present invention are shown in FIG. 2. It is preferred, although not required, that the head have at least one undercut portion that extends away from the stem at approximately a 90 degree angle, such as the heads shown in FIGS. 2(a), 2(b), 2(e), 2(f), 2(g), 2(i), 2(j), and 2(k), to hook the engaging members of an opposed mating surface. It is also possible to provide a head having portions that extend toward the base of the stem, creating an "underhang" portion of the head. In other embodiments, each stem is provided with two or more heads, the shape of which may be selected as desired.

The length of head 30 is preferably between approximately 0.05 mm and 2.0 mm (0.002 and 0.079 in), and is more preferably between approximately 0.1 and 1.1 mm (0.004 and 0.045 in), measured from the first point at which the head portion departs from the stem to the point most distant therefrom. These size ranges are for hooking stems that are adapted for interengagement with a durable loop material.

The size of the portion of the head that extends radially beyond the stem can be important for insuring proper engagement and disengagement of the abrasive article and the opposed surface. If the head extends radially beyond the stem for too little a preferably between 0.25 and 0.76 mm (0.01 and 0.03 in). The overall length of the hooking stem is preferably between approximately 0.01 and 10 mm (0.0004 and 0.40 in), more preferably between 0.05 and 2.6 mm (0.002 and 0.102 in), and most preferably between 0.13 and 1.0 mm (0.005 and 0.04 in). It should be noted that hooking stem shapes, diameters, and lengths can be mixed within a given abrasive article, such that the abrasive article comprises hooking stems of more than one shape, diameter, and/or length. Also, the shape, size, and orientation of the hooking stems may be selected to provide a suitable shear strength and peel strength for a given application.

Hooking stems 22 may be straight or arcuate, and may be arranged in a regular array or be randomly distributed across the second major surface. For example, it may be desirable to provide helical hooking stems, and to arrange the hooking stems in parallel, sinusoidal columns. The hooking stem density can be selected as desired, and preferably is between approximately 8.0 and 310 hooking stems per square centimeter (50 and 2000 hooking stems per square inch), although other hooking stem densities can be provided.

Figure 4:
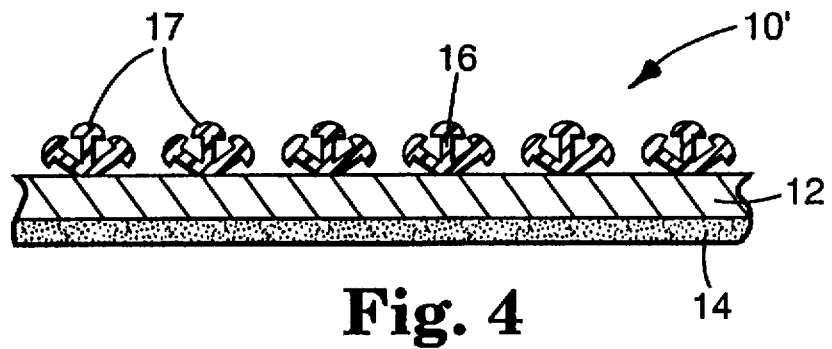
FIG. 4 is a sectional view of an abrasive article having hooking stems arranged in a plurality of clusters.

The hooking stems 16 may also be arranged in a plurality of clusters, as shown in FIG. 4 at 17. That is, two or more adjacent stems may be placed close to each other in a cluster, with adjacent clusters separated from each other by a distance greater than the distance between the stems within a cluster. The stems within each cluster could be inclined at any suitable orientation, although the stems within each cluster are preferably inclined at different orientations. Furthermore, the clusters could be randomly or uniformly distributed over the surface to which the stems are attached, as suitable to the particular application. Clusters can be provided in a plurality of rows, or stripes, and those rows may be parallel (either straight rows, or curvilinear rows). distance, the disengagement force between the abrasive article and the opposed surface may be insufficient. Conversely, if the head extends beyond the stem for too great a distance, the heads may not engage with the opposed surface, or if a sufficient number of heads engage, the disengagement force may be greater than is desired. Thus, it is preferred that the maximum head diameter exceed the stem diameter by at least approximately 0.05 mm (0.002 in), but not by more than approximately 1.5 mm (0.06 in).

The hooking stems are preferably generally perpendicular to the second surface, although the hooking stems may be inclined with respect to the second surface if desired. Also, it may be desirable to provide heads at either a predetermined orientation or at a random orientation relative to each adjacent head, to increase the disengagement force associated with the disc. In addition, for an abrasive article such as a disc to remain firmly attached to a mating surface while in use, it is preferred that if the heads on the hooking stems are provided on only one side of the stem (known as a "directional" hooking stem), then the heads on the hooking stems should not all have the same orientation.

In another embodiment, the hooking means of the present invention comprises hooking stems having an included distal end angle of less than approximately 90 degrees, as shown in FIGS. 3(a) through 3(d). The included distal end angle, which is illustrated by the symbol a in FIG. 3, is defined as the included angle between a straight line perpendicular to the second major surface at the proximal end of the hooking stem (line $L_1$ in FIG. 3) and a straight line extending through and concentric with the distal end of the hooking stem (line $L_2$ in FIG. 3). When angle a is less than approximately 90 degrees, the distal end of each hooking stem is adapted to hook an engaging structure of an opposed surface, and yet may be released from that structure by an appropriate tensile force. Hooking stems constructed in accordance with this embodiment may also include a head of the type described with reference to FIG. 2, above, but a head is not required due to the specified distal end angle of the hooking stems.

Abrasive articles according to the present invention may be attached to surfaces, such as a back-up pad, having any suitable engaging structures, such as fibers, filaments (such as brushed nylon and brushed polyester), woven and nonwoven fabrics, knitted fabric, and stitch-bonded fabrics. Other applications are also contemplated, such as attachment to foam (particularly open-cell foam) or to a compatible set of engaging hooks.

When the abrasive article is attached to an opposed surface, such as a surface having a plurality of loop members, not all of the hooking stems must engage with the structures (such as a loop) of the opposed surface. Typically, a majority of the hooking stems will hook the structures of the engaging surface, and the disengagement force will typically be directly related to the number of hooking stems that are engaged. The percentage of hooking stems that are engaged by a particular opposed surface depends on many factors, such as hooking stem dimensions and density, and the topography of the opposed surface.

In the various abrasive articles just described, and in the methods of making such abrasive articles described below, the hooking stems are typically formed by molding a flowable material. The flowable material can be any suitable material, such as a polymer, a metal, or a ceramic precursor. It is also within the scope of this invention to use two or more different flowable materials to make the hooking stems. For instance, one flowable material may be used to form the head and a second flowable material may be used to form the stem.

The preferred flowable material is a polymeric material, such as a thermoplastic material or a thermosetting material. Suitable materials include a thermoplastic polyurethane, polyvinyl chloride, polyamides, polyimides, polyolefins (e.g. polyethylene and polypropylene), polyesters (e.g. polyethylene terephthalate), polystyrene, nylons, acetal, block polymer (e.g. polystyrene materials with elastomeric segments, available from Shell Chemical Company of Houston, Tex. under the designation Kraton™), polycarbonate, thermoplastic elastomers, and copolymers and blends thereof. Specific examples of materials that are believed to have utility in the context of the present invention include a polypropylene random copolymer available from the Shell Chemical Company of Houston, Tex. under the designation SRD6-321, a polypropylene random copolymer available from the Shell Chemical Company of Houston, Tex. under the designation SRD7-463, a polyester hot-melt adhesive available from the Bostik Company of Middleton, Mass. under the designation 7199, and a polyamide hot-melt adhesive available from the Henkel Company of Kankakee, Ill. under the designation Macromelt 6300. The flowable material may also contain additives including but not limited to fillers, fibers, antistatic agents, lubricants, wetting agents, surfactants, pigments, dyes, coupling agents, plasticizers, suspending agents, and the like.

The method of the present invention may be practiced in numerous ways, some of which are specifically described and illustrated herein to facilitate a complete understanding of the invention. It should be borne in mind with regard to each of the illustrated embodiments that although the projecting stems 16 are shown as spaced apart, and comparatively tall relative to the thickness of the substrate, the hooking stems are typically on the order of 0.01 to 10.0 mm (0.0004 to 0.4 in) in length, and are typically provided at a density of approximately 8 to 310 hooking stems per square centimeter (50 to 2000 stems per square inch).

The hooking stems of the inventive method are preferably formed by a process requiring the addition of energy (in the form of heat or radiation, for example) to a formed thermoplastic or thermosetting resin. This process is believed to have utility in forming hooking stems having either heads or included distal end angles of less than approximately 90 degrees, and stands in contrast to the textile manufacturing methods of the prior art.

Figure 5:
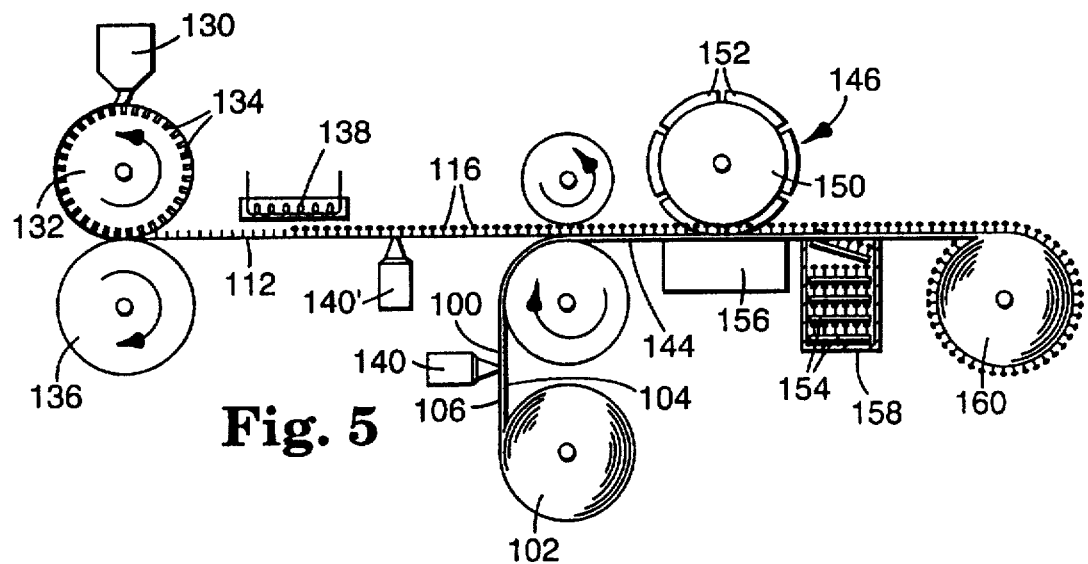
FIG. 5 is a schematic illustration of an apparatus and process for carrying out the method of the present invention.

FIG. 5 illustrates one embodiment of an apparatus and process for carrying out the method of the present invention. This embodiment of the generally involves molding hooking stems and a base sheet from which the hooking stems project, and laminating the base sheet to an abrasive sheet to form the abrasive article of the present invention.

Abrasive sheet 100 is provided, preferably in a roll 102, which sheet includes first and second major surfaces 104 and 106. First major surface 104 includes means for abrading a surface, including but not limited to a coated abrasive, a structured coated abrasive, a lapping coated abrasive, or a non-woven abrasive.

Also provided is a base sheet 112, including a plurality of projecting stems 116. The hooking means may either be provided in-mold (molding one or more heads on each stem, or molding hooking stems having an included distal end angle of less than approximately 90 degrees, for example), or may be provided by a post-forming process (heating unheaded stems to provide a head, or heating a straight stem to provide an included distal end angle of less than approximately 90 degrees, for example). The molding step may include any suitable molding apparatus, as known in the molding art. For example, the hooking stems and base sheet could be injection molded, molded by compressing a heated sheet member against a molding surface, or molded by flowing a flowable material over and into the cavities of a mold, which may be stationary or moving (e.g. a belt, a tape, or a drum).

In the embodiment illustrated in FIG. 5, the base sheet 112 is provided by a process such as that disclosed in U.S. patent application Ser. No. 08/048,874, entitled "Mushroom-Type Hook Strip For A Mechanical Fastener", filed Apr. 18, 1992 and assigned to the assignee of the present invention, the contents of which is hereby incorporated by reference herein.

As illustrated schematically in FIG. 5, the process includes an extruder 130 adapted for extruding a flowable material, such as a thermoplastic resin, onto a mold 132. The surface of the mold includes a plurality of arranged cavities 134, which are adapted to form a like plurality of stems from the flowable material. The cavities 134 may be arranged, sized, and shaped as required to form a suitable stem structure from the flowable material. Typically, a sufficient additional quantity of flowable material is extruded onto mold 132 to form base sheet 112 concurrently. Mold 132 is rotatable and forms a nip, along with opposed roll 136. The nip between mold 132 and opposed roll 136 assists in forcing the flowable material into the cavities of the mold, and provides a uniform base sheet 112. The temperature at which the foregoing process is carried out depends on the particular material used. For example, the temperature is in the range of 230° to 290° C. (446° to 554° F.) for a random copolymer of polypropylene available from the Shell Oil Company of Houston, Tex., under the designation WRS6-165.

The mold may be of the type used for either continuous processing (such as a tape, a cylindrical drum, or a belt), or batch processing (such as an injection mold), although the former is preferred. The cavities of the mold may be formed in any suitable manner, such as by drilling, machining, laser drilling, water jet machining, casting, etching, die punching, diamond turning, and the like. The placement of the cavities determines the spacing and orientation of the hooking stems on the base sheet, and thus on the abrasive article. The mold cavities can be open at the end of the cavity opposite the surface from which the flowable material is applied to facilitate injection of the flowable material into the cavity. If the cavity is closed, a vacuum can be applied to the cavity so that the flowable material fills substantially the entire cavity. Alternatively, closed cavities can be longer than the lengths of the stems being formed so that the injected material can compress the air in the cavities. The mold cavities should be designed to facilitate release of the stems therefrom, and thus may include angled side walls, or a release coating (such as Teflon™) on the cavity walls. The mold surface may also include a release coating thereon to facilitate release of the base sheet from the mold.

The mold can be made from suitable materials that are rigid or flexible. The mold components can be made of metal, steel, ceramic, polymeric materials (including both thermosetting and thermoplastic polymers) or combinations thereof The materials forming the mold must have sufficient integrity and durability to withstand the thermal energy associated with the particular molten metal or thermoplastic material used to form the base sheet and hooking stems. In addition, the material forming the mold preferably allows for the cavities to be formed by various methods, is inexpensive, has a long service life, consistently produces material of acceptable quality, and allows for variations in processing parameters.

The flowable material is flowed into the mold cavities, and over the surface of the mold to form the base sheet. To facilitate flow of the material, the material typically must be heated to an appropriate temperature, and then coated into the cavities. This coating technique can be any conventional technique, such as calendar coating, cast coating, curtain coating, die coating, extrusion, gravure coating, knife coating, spray coating, and the like.

After the thermoplastic material has been coated into the mold cavities and over the mold surface, the material is cooled to solidify and form the hooking stem. The flowable material is solidified in and on the mold to form the hooking stems and base sheet, which are then separated from the mold. The flowable material will often shrink when it is solidified, which facilitates release of the hooking stems and base sheet from the mold. Part or all of the mold may be cooled to aid in solidifying the hooking stems and base sheet. Cooling can be effected by the use of water, forced air, liquid nitrogen, or other cooling processes.

It may be preferred to have molecularly oriented stems for some applications. Molecularly oriented stems have significantly greater stiffness and durability, as well as greater tensile and flexural strength, than would be achievable without such orientation. As compared to unoriented stems, the enhanced strength of oriented stems makes them less likely to break during disengagement. In order to afford molecular orientation, the walls of the cavities should be cooled to a temperature such that the injected flowable material solidifies along the walls while continuing to fill the core of each cavity. After the core of the cavity has been filled, the cooling must be continued to maintain the molecular orientation and to allow the stem to be pulled from the cavity. Afterwards, it may be desirable to apply heat to the wall of the cavity before it is again injected with flowable material to form the hooking stems.

When thermosetting resins are used as the flowable material, the resin is applied to the mold as a liquid in an uncured or unpolymerized state. After the resin has been coated onto the mold, it is polymerized or cured until the resin is solid. Generally the polymerization process involves either a setting time, or exposure to an energy source, or both to facilitate the polymerization. The energy source, if provided, can be heat or radiation energy such as electron beam, ultraviolet light or visible light. After the resin is solidified it is removed from the mold. In some instances, it may be desired to further polymerize or cure the thermosetting resin after the hooking stem is removed from the tool. Examples of suitable thermosetting resins include melamine formaldehyde resins, acrylate resins, epoxy resins, urethane resins, and the like.

As noted previously, hooking means may be provided by post-forming straight stems that project from the base sheet. Post-forming is believed to be especially useful with thermoplastic materials. One useful post-forming technique involves the application of heat (including but not limited to convective heating by a hot air stream or the like; radiative heating by heat lamp, heated wire, or the like; flash photolysis; or by conductive heating due to contact between the hooking stems and a heated surface such as a heated roll or plate) to produce a head on the stem, or to produce a hooking stem having an included distal end angle of less than approximately 90 degrees. Hooking means are provided in the illustrated embodiment, in the form of a head adjoining each stem, by heating the stems with a heated plate 138, but may also be provided by contacting the distal ends of the stems with a heated calendering roller to form the heads. Other heating means are contemplated. For example, a base sheet having a plurality of straight, projecting stems may be passed through a nip, with the nip roll that contacts the distal ends of the stems being heated, and the opposed nip roll being chilled, to produce localized heating and compression of the distal end. When SRD7-463 polypropylene resin is used, a hot nip roll temperature of between 143° to 154° C. (290° to 310° F.), and nip pressure of greater than 0.552 MPa (80 psi) has been shown to have utility. The heated nip roll typically forms a "nail head" type hooking stem of the type shown in FIG. 2(b).

Abrasive sheet 100 and base sheet 112 are then bonded together to form the abrasive article of the invention by using, for example, an adhesive applied to one or both of the sheets at 140 and 140'. The abrasive sheet and the base sheet, in this and other embodiments, together form a laminate which is the substrate of the inventive abrasive article. The laminating adhesive can be a thermoplastic or thermosetting material as described above, or a pressure sensitive adhesive. The adhesive may comprise, for example, acrylic pressure sensitive adhesive, rubber-based PSA, waterborne lattices, solvent-based adhesives, radiation cured adhesives, and two-part resins (e.g. epoxies, polyesters, or polyurethanes). Other bonding means may also be used, including but not limited to heating the base sheet 112 to facilitate adhesion between the base sheet and the abrasive sheet 100, or corona treating either or both of the abrasive sheet 100 or the base sheet 112 to enable reciprocal bonding. The base sheet and the abrasive sheet may be laminated together using pressure (at a nip roller, for example) to form the abrasive article.

Following lamination, the abrasive sheet material 144 is conveyed to converting station 146. Converting station 146, in the illustrated embodiment, includes rotary die cutting apparatus 150, including die portions 152 adapted to cut abrasive articles 154 from sheet material 144. Cutting surface 156 supports the sheet material 144 during cutting, and the abrasive articles 154 may be collected in, for example, bin 158. Other converting station structures are also within the scope of the present invention, and may comprise, for example, a batch die cutting apparatus or the like. The individual abrasive articles may be connected together and collected on a roll, in the manner described in U.S. Pat. No. 3,849,949 (Steinhauser et al.), or may be cut into discrete abrasive articles as shown. The scrap sheet material may be collected on a roll 160, for disposal or further processing.

Figure 6A:
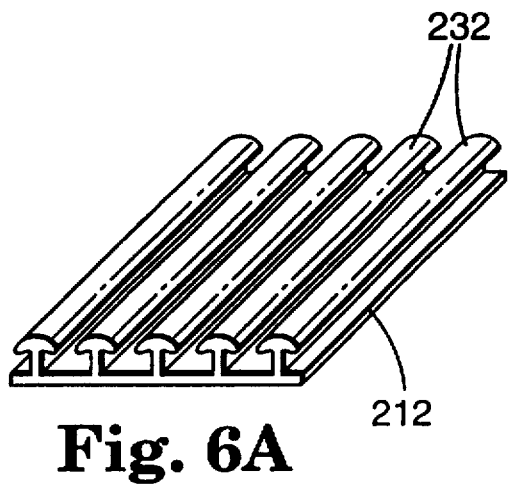
FIGS. 6A and 6B are perspective views of a base sheet during two stages of the process illustrated in FIG. 6.
Figure 6B:
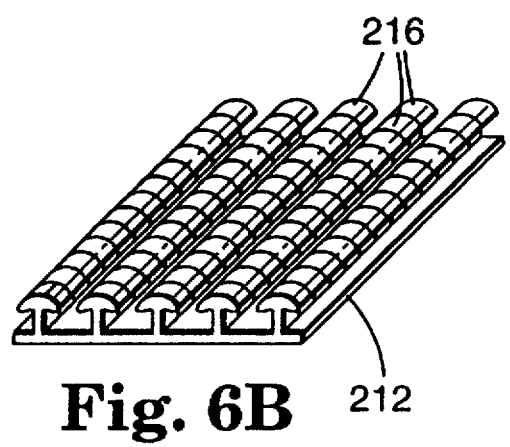
Figure 6:
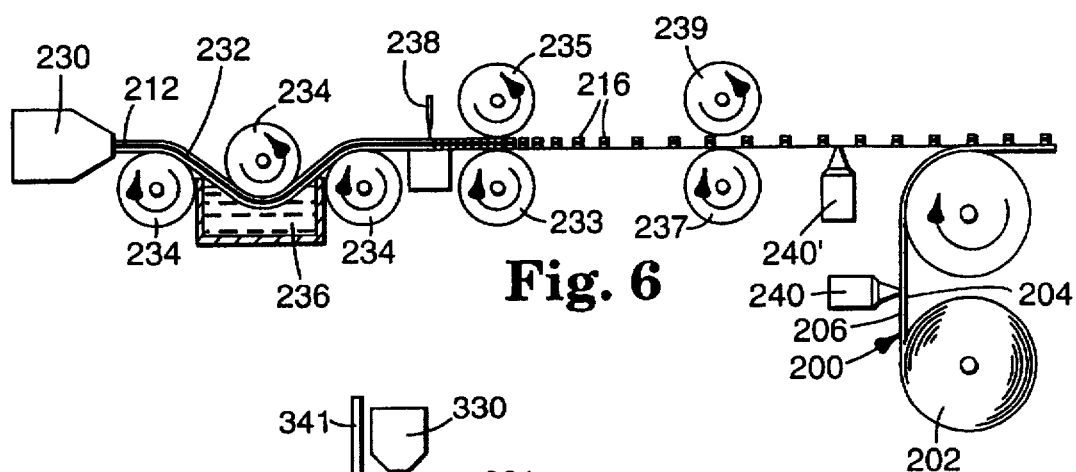
FIG. 6 is a schematic illustration of a second apparatus and process for carrying out the method of the present invention.

A second embodiment of an apparatus and process for carrying out the method of the present invention is shown in FIG. 6. Abrasive sheet 200 is provided, preferably in a roll 202, which sheet includes first and second major surfaces 204 and 206. First major surface 204 includes means for abrading a surface, which may include, for example, a coated abrasive, a structured coated abrasive, a lapping coated abrasive, or a non-woven abrasive.

A base sheet 212 is provided by a process such as that disclosed in U.S. Pat. No. 4,894,060 (Nestegard), the contents of which is hereby incorporated by reference herein. As illustrated schematically in FIG. 6, the base sheet 212 is extruded from a flowable material by an extruding apparatus 230, and includes a plurality of rail members 232 projecting therefrom. An exemplary extruded base sheet 212 is illustrated in FIG. 6A. The rail members 232 may have any suitable cross-sectional shape, taken perpendicular to the base sheet, and preferably have a cross-sectional shape similar to one of the side views shown in FIG. 2. Adjacent rail members should be separated by at least about 0.50 mm (0.02 in) on center, and preferably between 1.1 to 2.8 mm (0.045 to 0.11 in) on center, when the hooking stems will engage a durable loop material. The die openings of the extruder substantially determine the profile of the rail members, and the die openings may be formed in the extruder by any suitable process, such as electron discharge machining. The material from which the base sheet and rail members are made may be any suitable material, such as a thermoplastic resin.

The base sheet 212 is wound around rollers 234 through a quench tank 236 filled with a cooling medium, such as water, after which the rail members are transversely cut at spaced locations along their lengths by cutting apparatus 238. Cutting apparatus 238 may be, for example, a reciprocating or rotating knife, a hot wire, a collimated water jet, laser, or other suitable cutting means. FIG. 6B illustrates the base sheet 212 and rail members 232 after the operation of cutting apparatus 238. Preferably, the cutting apparatus includes reciprocating blades oriented at an angle of approximately 60 degrees to 70 degrees with respect to length of the rail members 232, because the rail members 232 are less likely to deflect laterally when cut from this angle than when cut at a 90 degrees angle. The rail member preferably is cut an intervals of approximately 0.1 to 3.0 mm (0.004 to 0.118 in) along the length of the rail member.

The cut portions of the rail members form discrete, closely spaced hooking stems 216 projecting from the base sheet 212. To separate the hooking stems, the base sheet 212 is longitudinally stretched at a stretch ratio of at least 2 to 1, and preferably at a stretch ratio of about 4 to 1, to provide spaces between adjacent hooking stems. The stretching process preferably separates adjacent hooking stems by at least 0.50 mm (0.02 in), and more preferably by at least 1.1 to 2.8 mm (0.45 to 0.11 in) for engagement with a durable loop material. The base sheet is stretched between a first pair of nip rollers 233 and 235 and a second pair of nip rollers 237 and 239, and the two pairs of nip rollers are driven at different surface speeds. Roller 233 is heated to heat the base sheet 212 prior to stretching, and the roller 237 is chilled to stabilize the base sheet 212 after stretching.

In a variation of the foregoing process, the extruded base sheet includes rail members that do not include a top overhanging portion. When the rail members are cut and the base sheet stretched, the individual stems may then be heated to form heads atop each stem described with reference to the embodiment of FIG. 5. In this manner, the heads of the hooking stems are post-formed, rather than extruded integrally with the rail members.

Abrasive sheet 200 and base sheet 212 are bonded together to form the abrasive article of the invention by using, for example, an adhesive applied to one or both of the sheets at 240 and 240'. The adhesive may comprise, for example, acrylic pressure sensitive adhesive, rubber-based PSA, waterborne lattices, solvent-based adhesives, and two-part resins (e.g. epoxies, polyesters, or polyurethanes). Other bonding means may also be used, including but not limited to heating the base sheet 212 to facilitate adhesion between the base sheet and the abrasive sheet 200, or corona treating either or both of the abrasive sheet 200 or the base sheet 212 to enable reciprocal bonding. The base sheet and the abrasive sheet may be laminated together using pressure (at a nip roller, for example) to form the abrasive article. It should be noted that the hooking stems could instead be directly coated onto a substrate, such as a polymeric film or paper, following the stretching process, and the substrate subsequently laminated to the abrasive sheet member in the same manner as described. Following lamination, the abrasive sheet material may be conveyed to a converting station such as that described above with reference to FIG. 5 for further processing.

Figure 7:
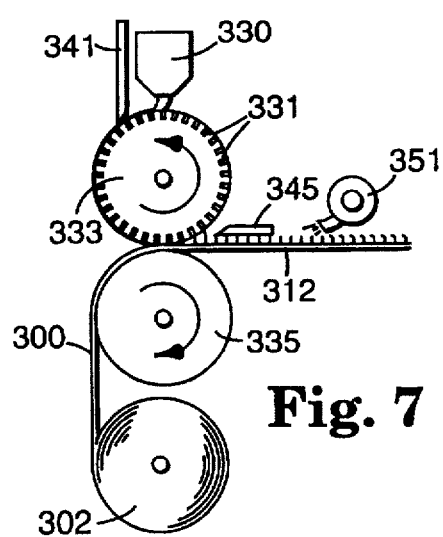
FIG. 7 is a schematic illustration of a third apparatus and process for carrying out the method of the present invention.

The apparatus and process illustrated in FIG. 7 is also suitable for use with the method of the present invention. The general operation of the process is similar to embodiments described with reference to FIGS. 5 and 6 above, with the following exceptions. The base sheet 312 is provided by a process such as that disclosed in U.S. Pat. No. 5,058,247 (Thomas et al.), the contents of which is incorporated by reference herein. As shown in FIG. 7, the hooking stems 316 are coated directly onto the abrasive sheet member 300 using a modified gravure printing process. It should be noted that the hooking stems could instead be coated onto a substrate, such as a polymeric film or paper, and the substrate previously or subsequently laminated to the abrasive sheet member 300 in the same manner as described. As with the method described above, hooking stems may be directly formed on an abrasive sheet either with or without hooking means, whereby in the latter case hooking means may be provided by a post-forming process.

The abrasive sheet member 300 is provided, preferably in the form of roll 302, and is passed through a nip formed between a print roll 333 (which acts as the mold) and an opposed roll 335. Print roll 333 includes cavities 331. Print roll 333 is heated to a temperature sufficient to prevent solidification of the flowable material in the cavities of the print roll 333. For example, a print roll temperature of between 150° to 200° C. (300° to 390° F.) is believed to be suitable for many hot-melt thermoplastics. The opposed roll 335 is preferably more compliant and resilient than the print roll 333, to cushion the flowable material as it is deposited on the coated abrasive member 300. The rolls 333 and 335 have mutually parallel central axes that are parallel to the plane of the abrasive sheet member 300. The rolls 333 and 335 are rotated about the respective central axes and have generally equal surface velocities, in both magnitude and direction, at the nip point. The velocities of the respective rolls may be different, if desired.

Flowable material is coated, extruded or otherwise applied to print roll 333 by extruder 330. The flowable material is preferably a thermoplastic material, but other materials, including those listed above with reference to the methods illustrated in FIGS. 5 and 6, are also contemplated. A doctor blade 341 in contact with the print roll 333 may be provided, to insure an even coating of all the cavities 331 in print roll 333 and to minimize the amount of flowable material on the print roll between the cavities. By coating the flowable material, such as a hot-melt thermoplastic material, onto the rolls 333 and 335, and by rotating the rolls as shown, the flowable material may be deposited from the print roll 333 onto the abrasive sheet member 300. The cavities 331 of the print roll 333 deposit the flowable material onto the abrasive sheet to form hooking stems in a desired pattern. The shape of the cavities in the print roll 333 may be of any suitable shape for forming a stem. For example, the cavities may be cylindrical, with a depth equal to approximately 50% to 70% of the diameter of the cavity.

The temperature of print roll 333 is not critical, however, preferably the print roll is heated to prevent solidification of the flowable material during transfer from the extruder 330 to the print roll and then to the backing. Generally, a print roll surface temperature near the flowable material temperature is desired. A chill roll may be necessary if the backing, such as abrasive sheet 300, is adversely affected by the heat of the deposited flowable material. The chill roll can be incorporated into opposed roll 335.

The flowable material should be kept slightly above its melting point before it is applied to print roll 333. The melting point is the temperature at which the flowable material is wholly in a liquid state. If the material is kept too hot, it may not be viscous enough to produce a hooking means of desired shape. If the material is kept too cool, it may not properly transfer into the cavities on the print roll 333, or from the print roll to the backing of the abrasive sheet 300.

As the print roll 333 and the abrasive backing separate downline of the nip, the flowable material typically extends between the print roll 333 and the abrasive backing 300 in a thread-like form, and a severing apparatus 345 (such as a hot wire, a laser, or knife) is used to sever the flowable material thread. One suitable severing apparatus comprises a nickel-chromium wire having a diameter of about 0.51 mm (0.02 in) heated to a temperature of between 343° to 416° C. (650° to 781° F.). The molten portion of the thread connected to the abrasive sheet member 300 tends to wilt under appropriate conditions, thus forming a hooking stem having an included distal end angle of less than approximately 90 degrees, as shown in FIGS. 3(a), 3(b), 3(c), and 3(d). The severing apparatus 345 should be positioned to allow stretching of the flowable material before it is severed. If the severing apparatus is too far from the backing, the deposited material may pass underneath the severing apparatus and not be intercepted by it, forming a long hooking means which will not be properly shaped. If the severing apparatus is too close to the backing, the stem may be truncated without forming a hooking portion.

An air stream 351 can be used to alter the structural features of the hooking stems and to orient the direction the hooking stems in one or more predetermined directions, or in random directions. A random orientation may be desirable for increasing the disengagement force between the abrasive article and an opposed surface. The hooking stems should then be allowed to solidify before contact with other objects. Following orientation of the hooking stems, the abrasive sheet material may be conveyed to a converting station such as that described above with reference to the embodiment of FIG. 5 for further processing.

In another aspect of the above method, an additional bonding adhesive material may be applied to either the back side of the backing or to the outer surface of the mold, or to both. The bonding adhesive, which can be a thermoplastic or thermosetting material as described above, bonds the hooking stems to the abrasive article backing.

Other methods of providing stems and hooking portions are also contemplated, including the methods described in U.S. Pat. No. 4,454,183 (Wollman), and 5,100,400 (Mody et al.), the contents of which are incorporated herein by reference. Each of these patents generally discloses headed stems in a woven backing, which backing in the context of the present invention could be applied to an abrasive sheet in the manner described herein.

An abrasive article of unitary construction can be made by any of the foregoing techniques. A unitary construction denotes an abrasive article wherein the base sheet having projecting hooking stems is also the abrasive sheet having abrasive means on the opposite surface. Stated differently, a single sheet member has hooking stems projecting from one face thereof, and abrasive means on the opposite face thereof. The sheet member should be made from a material that has sufficient strength, integrity and heat resistance to withstand the conditions associated with the manufacture and intended application of the abrasive article. A key to such a construction is the provision of a flat surface on the surface opposite the hooking stems. The flat surface enables an abrasive medium, such as mineral particles, to be embedded in or bonded to the flat surface to provide the abrasive article.

It is also within the scope of the present invention to mold the substrate and hooking stems simultaneously. The materials used to make the substrate and the hooking stems may be the same or different, and in one embodiment, the material used to make the substrate is more rigid than the material used to make the hooking stems.

In another aspect of the invention, printed indicia may be provided on a surface of the abrasive article, such that the printed indicia is visible through either or both of the hooking stems or the abrasive material.

Abrasive sheet members of the foregoing construction may be attached to surfaces (such as a back-up pad) having fibers, filaments, such as brushed nylon, brushed polyester, woven and nonwoven fabrics, knitted fabric, and stitchbonded fabrics. Other applications are also contemplated, such as attachment to foam (particularly open cell foam) or to a compatible set of hooking stems.

The present invention will be further described with reference to the following Examples, which are intended to be illustrative rather than limiting.

EXAMPLE 1

An abrasive article was made as follows, generally in accordance with the teachings of U.S. Pat. No. 5,077,870 (Melbye et al.), the contents of which is incorporated by reference herein, using an apparatus and process such as that shown in FIG. 5. The mold was a steel mold having a cylindrical peripheral surface, and included a plurality of frusto-pyramidal-type cavities drilled therein. The cavities were drilled using a bit having a tip width of 0.15 mm (0.006 in) in the manner described in Melbye et al. to form a cavity that would facilitate release of the material molded therein. Each frusto-pyramidal-type cavity had a base diameter of approximately 0.61 mm (0.024 in) at the mold surface, tapered to a diameter of 0.36 mm (0.014 in) at a point 0.07 mm (0.00275 in) below the mold surface, and tapered to a diameter of 0.23 mm (0.009 in) at the deepest point of the cavity, which was 0.76 mm (0.03 in) below the mold surface.

The cavities were formed at a density ranging from approximately 50 cavities per square centimeter to approximately 90 cavities per square centimeter in a cavity array area measuring 50 mm by 60 mm (1.97 in by 2.36 in). The cavity array area was repeated over the outer cylindrical surface of the 25.4 cm (10 in) diameter cylindrical mold, such that the mold surface was substantially covered with adjacent cavity arrays measuring 50 mm by 60 mm.

A vacuum force of approximately 45 mm (1.77 in) of mercury was applied to the cavities to draw material into the cavities. The mold was cooled internally with water at 35° C. (95° F.). A random polypropylene/polyethylene copolymer (4% polyethylene) of the type available from the Shell Oil Company of Houston, Tex. under the designation WRS6-165 was prepared by heating the copolymer to a temperature of approximately 235° C. (455° F.). The copolymer was extruded onto the mold surface and into the cavities. A layer of copolymer resin was allowed to form over the mold surface to provide a base sheet, and the thickness of the base sheet ranged from approximately 0.14 to 0.18 mm (0.0055 to 0.007 in). The base sheet wrapped around approximately 75% of the cylindrical periphery of the mold, and the line speed was approximately 7.5 meters per minute (25 feet per minute). The solidified resin was stripped from the mold as a web having stems projecting from the base sheet.

The base sheet with stems was twice passed through a nip of two stacked calender rolls at a line speed of approximately 3.0 meters per minute (10 feet per minute) with the top roll maintained at a temperature of approximately 140° C. (284° F.). The first pass was made with a gap between the calender rollers of 0.71 mm (0.028 in) and the second pass at a gap of 0.55 mm (0.022 in). The headed hooking stems produced in this manner had a height of 0.5 mm above the base sheet, and had a head overhanging the hooking stem by between 0.15 to 0.2 mm (0.006 to 0.008 in). The hooking stems generally resembled those the embodiment illustrated in FIG. 2(b).

The web of headed hooking stems was laminated to the back surface of a 15.24 cm (6.0 in) diameter abrasive disc of the type available from the Minnesota Mining and Manufacturing Company of St. Paul, Minn., under the designation 3M 255L Stikit™ Film abrasive (P-180) using polyacrylate pressure sensitive adhesive (PSA). After the stem web contacted the PSA surface of the abrasive disc, a small rubber roller was used to facilitate adhesion therebetween. The abrasive article was then passed through a pair of rollers providing a nip pressure of approximately 60 newtons per square centimeter. The resultant abrasive discs were tested in conjunction with a back-up pad having a durable textile loop material of the type available from Guilford Mills, Inc., of Greensboro, N.C. under the designation 19037, and were found to perform satisfactorily.

EXAMPLE 2

An abrasive article was made as follows, generally in accordance with the teachings of U.S. Pat. No. 4,894,060 (Nestegard), using an apparatus and process such as that shown in FIG. 6. An extrusion die was provided, and included a die opening adapted to form a rail fastener member having a base sheet and a plurality of rails projecting therefrom. The rails measured 1.27 mm (0.05 in) high, 0.76 mm (0.03 in) wide at the head portion of the rail, and were spaced at approximately 2.0 mm (0.08 in) on center. The cross-sectional profile of the rail members generally resembled the stem design shown in FIG. 2(f). The thickness of the base sheet was approximately 0.2 mm (0.008 in).

A random polypropylene copolymer available from Shell Oil Company of Houston, Tex. under the designation SRD6-321 was heated to a temperature of approximately 230° C. (446° F.) and was extruded by a 30 mm (1.2 in) extruder of the type available from Haake Incorporated of Paramus, N.J. The extruder operated at a screw speed of approximately 50 revolutions per minute to produce an output speed from the die of about 3.0 meters per minute (10.0 feet per minute) through the die opening to form the rail fastener member. The rail fastener member so formed was quenched in water at room temperature for approximately 60 seconds to promote solidification of the rail members and base sheet.

The rail members were cut transversely using a high speed rotary blade, drawn over a roll, heated to a temperature of approximately 149° C. (300° F.), and stretched at a stretch ratio of approximately 2:1 to form a multitude of discrete hooking members of the shape illustrated in FIG. 2(f). The resultant headed hooking stems were 0.7 mm (0.028 in) high (measured relative to the base sheet), and were separated from hooking stems formed from the same rail by 0.5 mm (0.02 in), and from hooking stems formed from adjacent rails by 0.76 mm (0.03 in). The width of the head atop each hooking stem was 0.76 mm (0.03 in), and the base sheet was 0.08 mm (0.003 in) thick.

The hooking stem base sheet was laminated to the back surface of a 15.24 cm (6.0 in) diameter abrasive disc of the type available from the Minnesota Mining and Manufacturing Company of St. Paul, Minn., under the designation 3M 255L Stikit™ Film abrasive (P-180) using polyacrylate pressure sensitive adhesive (PSA). After the base sheet contacted the PSA surface of the abrasive disc, a small rubber roller was used to facilitate adhesion of the strips to the abrasive discs. The abrasive article was then passed through a pair of rollers providing a nip pressure of approximately 60 newtons per square centimeter (80 pounds per square inch).

The resultant abrasive discs were tested in conjunction with a back-up pad having a durable textile loop material of the type available from Guilford Mills, Inc., of Greensboro, N.C. under the designation 19037. The force required to disengage the abrasive article from the back-up pad was so great that the abrasive disc and hooking stems were severely damaged when the abrasive article was removed from the back-up pad. It is believed that a different hooking stem design, or a different material, would yield an abrasive article having suitable release characteristics.

EXAMPLE 3

An abrasive article was made as follows, generally in accordance with the teachings of U.S. Pat. No. 5,058,247 (Thomas et al.), using an apparatus and process such as that shown in FIG. 7. The mold used to form the hooking stems was a gravure roll. The surface of the gravure roll included a plurality of frustoconical cavities, with a diameter at the roll periphery of 1.0 mm (0.04 in) and a depth of about 0.5 mm (0.20 in). The grid density was about 50 cavities per square centimeter (325 cavities per square inch).

A polyester hot-melt adhesive of the type available from Bostik Company of Middleton, Mass. under the designation 7199 was extruded onto the gravure roll at a melt temperature of approximately 220° C. (428° F.). The gravure roll was maintained at a temperature of approximately 180° C. (356° F.) during coating. A 0.02 mm (0.0009 in) thick polyester web made internally by the Minnesota Mining and Manufacturing Company, similar to that sold by Imperial Chemical Industries Americas, Inc., of Wilmington, Del. under the designation Type S, was conveyed adjacent the gravure roll, such that the gravure roll printed the hot-melt adhesive onto the polyester web. The surface speed of the gravure roll at the printing interface was approximately 3 to 4 meters per second (10 to 14 feet per minute).

As the polyester web separated from the gravure roll, the molten polyester adhesive was suspended between each of the cavities and the web, and was severed by a heated wire made of an alloy of nickel, iron, and chromium. The position of the heated wire should allow for the formation of the desired hooking stem shape. The exact location of the heated wire depends on the operating process parameters and environmental conditions. Typically, the hot wire is disposed approximately 14 to 22 mm (0.56 to 0.88 in) from the nip point in the machine direction, and approximately 4.8 to 7.9 mm (0.19 to 0.31 in) radially outward of the backing roll, and approximately 1.5 to 4.8 mm (0.06 to 0.19 in) radially outwardly from the print roll.

The severed stems wilted to form a hooking stem, and were oriented by directing a stream of air against the stems in the cross-web direction. The hooking stems so formed were similar to those illustrated in FIG. 3(a). The hooking stems had a height of about 0.6 mm (0.024 in) measured from the base sheet.

The hook printed polyester film was subsequently coated with a hot-melt pressure sensitive adhesive, and was slit to form a headed stem strip with a width of approximately 19 mm (0.75 in). The headed stem strip was laminated to the back surface of a 15.24 cm (6.0 in) diameter abrasive disc of the type available from the Minnesota Mining and Manufacturing Company of St. Paul, Minn., under the designation 3M 255L Stikit™ Film abrasive (P-180), which included a layer of polyacrylate pressure sensitive adhesive. Because the hooking stems were directional (i.e. were oriented in the same general direction) the hooking stems of each strip faced the opposite direction of each adjacent strip. That is, the hooking stems of each strip were oriented at approximately a 180 degree angle with respect to the orientation of the hooking stems of each adjacent strip. This alternate orientation was done to reduce or prevent the disc from shifting, or walking, with respect to the back-up pad.

After the hooking stem base sheet contacted the PSA surface of the abrasive disc, a small rubber roller was used to facilitate adhesion of the strips to the abrasive discs. The abrasive article was then passed through a pair of rollers providing a nip pressure of approximately 60 newtons per square centimeter. The resultant abrasive discs were tested in conjunction with a back-up pad having a durable textile loop material of the type available from Guilford Mills, Inc., of Greensboro, N.C. under the designation 19037, and were found to perform satisfactorily.

EXAMPLES 4–27

Abrasive discs were prepared as described below with reference to each of the particular Examples. These discs were then tested using the following test procedure, for purposes of comparing the performance of different discs. These Examples are provided only for purposes of illustration.

Test Procedure

The abrasive discs of the present invention were tested using a three mode abrasive attachment test. This test subjected each abrasive disc to certain conditions (described below) that were intended to simulate an actual abrading process, and the condition of the abrasive disc was then assessed at the conclusion of each mode of the test. The test procedure was as follows:

Step 1) The abrasive disc was attached to the back-up pad of a dual action air sander of the type available from National-Detroit Inc., of Rockford, Ill., under the designation DAQ, using two firm pats by the operator's hand. The abrasive disc was then removed from the back-up pad and replaced on the back-up pad, again using two firm pats by the operator's hand. The placement, removal, and replacement steps were intended to simulate repetitive use of the abrasive disc, and to simulate repositioning a disc that had been mispositioned.

Step 2) The abrasive disc was rotated by the pneumatic dual action sander, wherein the dynamic air pressure at the tool (the air pressure with the back-up pad allowed to rotate freely) was approximately 42 newtons per square centimeter (60 pounds per square inch). The abrasive face of the rotating abrasive disc was contacted to a flat, 14 gauge steel panel, at approximately a 5 degree angle between the panel and the plane of the abrasive disc. This was designated Mode 1, and the sanding continued at a force of approximately 110 N (25 lbs) for a period of approximately 15 seconds. The sanding action was from side-to-side for a total of 7.5 seconds (at approximately 1 second per sweep), and toward and away from the operator for a total of 7.5 seconds (at approximately 1 second per sweep).

Step 3) Following Step 2), the abrasive face of the abrasive disc was examined for evidence that the disc had puckered, creased, or wrinkled, and a grade was assigned to the condition of the abrasive disc based on the following criteria.

Grade 5: Superior, with no significant puckering (separation of the disc from the back-up pad) or wrinkling (creases in the disc). The abrasive disc stayed firmly attached to the back-up pad during the test.

Grade 4: Slight wrinkling of the abrasive disc, with either the center or the edge of the disc noticeably separated from the back-up pad.

Grade 3: Noticeable puckering (up to 25% of the disc separated from the back-up pad) or wrinkling (one or two creases with lengths less than 25% of the diameter of the disc).

Grade 2: Severe wrinkling and puckering of the abrasive disc; less than 50% of the disc in contact with the back-up pad.

Grade 1: Unacceptable; the abrasive disc detached from the back-up pad during the test.

Step 4) The abrasive disc was detached from the back-up pad of the dual action air sander, and then Step 1) was repeated.

Step 5) Repeat Step 2), except that the angle between the panel and the plane of the abrasive disc was 10 degrees.

Step 6) Repeat Step 3).

Step 7) Repeat Step 4).

Step 8) Repeat Step 2), except that the angle between the panel and the plane of the abrasive disc was 45 degrees.

Step 9) Repeat Step 3).

Any rating of 1 or 2 during any of the 3 modes signifies that the abrasive article is unacceptable for normal use because the attachment system could not adequately withstand the test conditions, which were intended to simulate actual abrading applications. A rating of 3 or 4 during one of the 3 modes indicates that the abrasive article may be acceptable for some applications, but may be unacceptable for other applications where wrinkling of the abrasive article is not tolerable. Thus, an acceptable abrasive article typically should be rated a 5 in at least two of the three test modes.

Each of the Examples 4–27 relates to a particular type of abrasive article that was subjected to the foregoing three mode test. The exemplary abrasive articles each had the following features in common. An abrasive disc was provided of the type available from the Minnesota Mining and Manufacturing Company of St. Paul, Minn., under the designation 3M 255L Grade P180 Stikit™ Gold Film. The abrasive disc included a layer of polyacrylate pressure sensitive adhesive on the rear face thereof, to which a backing layer having hooking stems was adhered. The hooking stems were of the "nail head" design generally shown in FIG. 2(b), the dimensions of the hooking stems are tabulated in FIGS. 8 and 8(a).

The abrasive sheet member with hooking stems was attached to a back-up pad having a loop material adhered thereto, in the manner described in the foregoing test procedure. The type of loop material used in each of the Examples is listed in FIGS. 8 and 8(a). The abbreviation "GM" in FIGS. 8 and 8(a) denotes that the loop material was knitted nylon fiber (nylon 6; 200 denier/10 filaments) of the type available from Guilford Mills, of Greensboro, N.C., under the designation 19073. The abbreviation "GNN" denotes that the loop material was a napped nylon fiber (40 denier; 12 filaments) of the type available from Guilford Mills, of Greensboro, N.C. under the designation 18904. The abbreviation "KA" denotes that the loop material was a knitted nylon fiber (210 denier; 12 filaments) of the type available from Kanebo Belltouch Ltd., of Osaka, Japan, under the designation 2A3. The abbreviation "KK" denotes that the loop material was a knitted nylon fiber (210 denier; 12 filaments) of the type available from Kanebo Belltouch Ltd., of Osaka, Japan, under the designation 2K3. The abbreviation "W" denotes that the loop material was a nylon fiber (48 denier; 12 filaments) of the type available from Woodeaves, Ltd., of Lancaster, England, under the designation 1909.

Example 4–27 compare abrasive articles having different characteristics, such as head diameter, stem diameter, head overhang, hook density, hooking stem height, and loop material, as shown in FIGS. 8 and 8(a). The overall performance was evaluated based on the grades assigned during each testing mode, and the evaluation is provided in the far right hand column of FIGS. 8 and 8(a). The Examples demonstrate that certain embodiments of the inventive abrasive article and method exhibit average or above average performance, and would likely be suitable for use in sanding applications.

Figure 9:
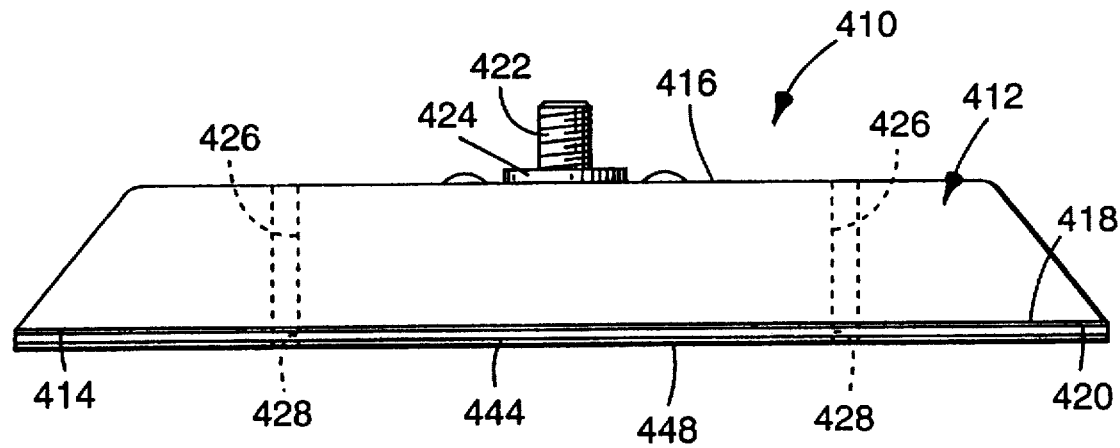
FIG. 9 is a side view of an abrading apparatus according to the present invention.

As shown in FIG. 9, the back-up pad 410 of the present invention generally includes a support member 412 and an engaging surface 420. Support member 412 includes a major surface 414, and preferably a minor surface 416. Major surface 414 is shown as planar, but could have any suitable topography. The back-up pad major surface may, for example, contain raised portions that increase the force applied to the work surface per area of the abrasive article, and can produce increased material removal rates. The shape of the back-up pad typically is the same as the shape of the abrasive article to be carried by the back-up pad, although this symmetry is not required. Some popular back-up pad shapes include a square, a triangle, a rectangle, an oval, a circle, a pentagon, a hexagon, an octagon, and the like.

The diameter for a circular back-up pad can range from about 1.25 to 125 cm (0.5 to 50 inches), typically about 2.5 to 75 cm (1 to 30 inches). The length and/or width of a non-circular back-up pad is usually on the same order, and can range from about 1.25 to 125 cm (0.5 to 50 inches), typically about 2.5 to 75 cm (1 to 30 inches).

The back-up pad may also have a slightly smaller diameter than the abrasive article. For example, the abrasive article may overhang the back-up pad by a very slight amount—typically less than 0.25 cm (0.1 inch), and preferably less than 0.13 cm (0.05 inch). The thickness of the back-up pad support member is typically in the range of 0.6 to 12.5 cm (0.25 to 5.0 in), although larger and smaller thicknesses are contemplated. The thickness of the back-up pad may also vary at different locations of the back-up pad.

The support member may be designed for use with a desired abrading application. For example, for wood and some metal sanding, the support member of the back-up pad is typically made of a compressible, resilient material, such as open and closed cell polymeric foams (such as soft closed cell neoprene foam, open cell polyester foam, polyurethane foam, reticulated or non-reticulated slabstock foams), rubber, porous thermoplastic polymers, and the like. For some applications, it is desirable to construct the support portion from a more rigid material, to facilitate the transmission of abrading forces in a localized area, such as for heavy stock removal or relatively high pressure abrading. Examples of suitable rigid materials include steel (including stainless steel and mild steel), hard rubbers, vulcanized rubbers, thermosetting polymers such as crosslinked phenolic resins, ceramics, laminated or pressed fibers, and the like.

The support member may also include optional front facing 418, which protects the support member and anchors the engaging surface 420 to the back-up pad. The front facing may include such materials as cloth, nonwoven substrates, treated cloth, treated nonwoven substrates, polymeric films, and the like. Preferred front facing materials include nylon coated cloths, vinyl coated nonwovens, vinyl coated woven fabrics, and treated woven fabrics.

If the back-up pad is intended to be mounted on a machine for movement thereby, the back-up pad will typically have some type of mechanical attachment means on minor surface 414. For instance, for random orbital applications the support member may include a threaded shaft 422 adjoining the minor surface and projecting orthogonally therefrom. The threaded shaft may be engaged with the output shaft of the machine, and the back-up pad secured to the machine thereby. Other attachment means are also contemplated, including but not limited to an unthreaded shaft, a threaded nut, a threaded washer, adhesives, and magnets.

If the back-up pad is intended to be used by hand, the support member can include a handle that makes the apparatus easier to manipulate. The handle is typically provided in place of the attachment means described in the preceding paragraph, but could instead be secured to the attachment means. Other suitable handle configurations can be provided as desired.

A backing plate 424 may also be provided, and may overlie the minor surface as shown in FIG. 9 to provide added rigidity to the back-up pad. Alternately, the backing plate may be incorporated into the support portion to provide additional rigidity. In the embodiment illustrated in FIG. 9, the threaded shaft attachment means adjoins the backing plate, and other variations may also be used.

The back-up pad may also include one or more holes, apertures, or passageways through which dust, debris, or an abrading fluid (such as water or oil) may be removed from the abrading surface. Passageways 426, shown in FIG. 9, are typically connected to a vacuum source that removes any generated dust and debris from the abrading surface. The abrasive article typically includes holes 428 in a size and pattern matching the passageways in the back-up pad of the present invention. Such holes and passageways are known in the art as exemplified by U.S. Pat. Nos. 4,184,291 and 4,287,685. Passageways may also or instead be provided for the provision or removal of water or other lubricants or grinding aids.

Figure 10:
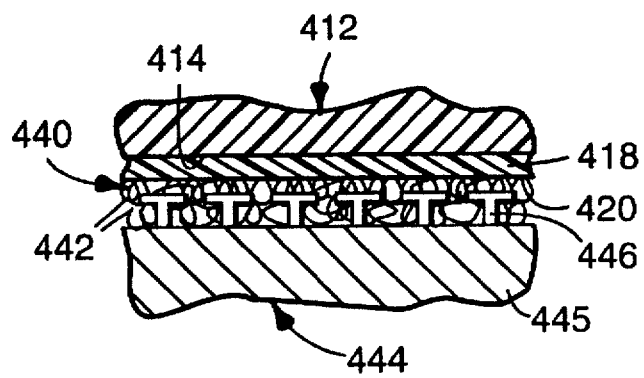
FIG. 10 is a sectional view of the interface between the back-up pad and the abrasive article of the present invention.

The back-up pad of the invention also includes an engaging surface 420 adjoining major surface 414. Engaging surface 420 facilitates the releasable attachment of abrasive article 444, which is described further hereinafter. Engaging surface 420 may directly adjoin or be integral with major surface 414, or may be bonded to front facing 418 or to other intermediate layers that are bonded to major surface 414, as shown in FIGS. 9 and 10. Although engaging surface 420 may take one of many different forms, each embodiment shares the common feature that the engaging surface is adapted for releasable engagement with a plurality of hooking stems. As used herein, a hooking stem means a stem having 1) a free end that is spaced from the surface to which the stem is attached, and 2) a structure that enables the hooking stem to releasably hook the features of the engaging surface. Two particular structures that enable a hooking stem to releasably hook the engaging surface are a head adjoining each stem, or a stem having an included distal end angle of less than approximately 90 degrees. It should be noted that not all of the hooking stems must engage with the engaging surface, but a sufficient number of hooking stems should be engaged to enable the abrasive article to be easily attached to and detached from the back-up pad, while preventing the abrasive article from shifting significantly relative to the back-up pad during use. The abrasive article will be described in greater detail hereinafter.

One embodiment of an engaging surface adapted for releasable engagement with a plurality of hooking stems is illustrated in FIG. 10. In that Figure, the engaging surface includes a loop fabric 440 secured thereto. Loop fabric 440 can be either knitted loop, warp knitted loop fabric, stitched loop fabric, or woven loop fabric, which fabric includes loops 442 that releasably engage the hooking stems 446 of the back side of the abrasive article 444 to attach the abrasive article to the back-up pad. The loop fabric material includes a plurality of loops 442 comprising filaments (either individual or grouped (such as a yarn)), anchored to the loop fabric material at each end. The hooking stems hook the loop opening to attach the abrasive article to the back-up pad.

The loop fabric preferably is durable, exhibits good holding power, does not fuzz, lint, or shed, and allows simple attachment and detachment of the abrasive article. Durability is an important parameter, because the back-up pad may be attached to and detached from hundreds or thousands of abrasive articles during its lifetime. Because the abrasive articles are disposable, meaning that they are usually discarded after one or a few uses, the durability of the back-up pad is more important than the durability of the abrasive article. Thus, it is preferred that the back-up pad, and particularly the engaging surface, be durable enough to withstand 100 or more engagements with an abrasive article.

The back-up pad, and particularly the engaging surface, should permit the abrasive article to be removed with a small amount of force, but should resist movement relative to the abrasive article during use. For example, a 90 degree peel force of less than approximately 0.36 kilograms per linear centimeter (about 2 pounds per linear inch), and preferably of approximately 50 grams per linear centimeter (0.3 pounds per linear inch) is suitable for some applications. A shear force (the force exerted on the disc in the plane of the major surface of the back-up pad) in the range of 710 to 1430 grams per linear centimeter (about 4 to 8 pounds per linear inch) is believed to be adequate to prevent the abrasive article from shifting relative to the back-up pad during use.

The height of the loops in this embodiment (i.e. the approximate average distance from the base of the loop fabric to the top of the loop) ranges from about 0.025 cm (0.010 inch) to 0.625 cm (0.25 inch), preferably 0.063 cm (0.025 inch) to 0.45 cm (0.175 inch), and more preferably between 0.125 cm (0.05 inch) to 0.325 cm (0.15 inch). If the loop height is too large, the abrasive article may shift during use, which decreases abrading performance and may be disadvantageous. If the loop height is too small, there may not be sufficient attachment of the hooking stems and the loop fabric. In general, the height of the loop fabric should be of the same order of magnitude as the height of the hooking stems. Additionally, the loop dimensions may depend upon the shape and type of hooking stems provided.

The loop density may also be selected to provide suitable performance characteristics. For example, the density of the loops can be the same as or different from the density of the hooks. The loop density usually ranges between 30 and 4000 loops per square centimeter (about 200 and 25,000 loops per square inch), preferably between 100 and 3000 loops per square centimeter (about 650 and 19,000 loops per square inch), and more preferably between 50 and 150 loops per square centimeter (about 325 and 970 loops per square inch). If the loop density is too high, the cost of the loop fabric typically increases, and it may be difficult to remove the abrasive article from the back-up pad without damaging one or the other component. If the loop density is too low, the peel and shear strength may be insufficient, which could decrease performance due to the insufficient attachment force.

The loop fabric material includes a plurality of loops comprising filaments. The filaments may be either individual filaments, or more preferably yarns comprising a group of twisted filaments, and the yarn denier preferably ranges from about 15 to 600 denier, and more preferably between 100 and 300 denier. The denier is a unit of fineness, based on a standard of 50 milligrams per 450 meters of yarn. Because one or more filaments or yarns may break when the abrasive article is removed from the back-up pad, it is preferred that there be a sufficient number of filaments in a yarn to provide a long lasting back-up pad. There are preferably between 2 to 25, and more preferably between 7 to 15 filaments in a single yarn. The denier of each filament usually ranges from about between 2 to 100, and more preferably between 10 to 30 denier. It is also possible to have several combinations of yarn and filament deniers in the same loop fabric. It should be noted that in the case where the abrasive article includes hooking stems having heads, the filament or yarn diameter is preferably about one-half of the distance that the head overhangs the stem.

The material from which the filaments are made may be selected as desired, and could include such organic materials as thermoplastic and thermosetting materials like polyamides (such as nylon), polyolefins, polyurethanes, aramids, polyester, cellulosic materials, or such inorganic materials as metal (including aluminum or steel) or ceramic (including glass and fiberglass). The filament may also be a combination of different materials. The filament may be straight, curved, or twisted, and may contain a surface treatment of some type, such as an antistatic coating, or silicone.

The breaking strength, or tenacity, of an individual filament should be at least 10 grams (0.35 ounces) and preferably at least 60 grams (2.1 ounces). It is preferred that as the abrasive article is removed from the back-up pad, the filaments, or segments of, do not break or discharge from the loop fabric. These filament remnants create an undesirable "fuzz" which can contaminate the workpiece being abraded, or other contaminant sensitive surfaces (freshly painted surfaces, for example). Thus the loop material should be sufficiently strong to minimize the fuzzing effect. Also, the filament should be sufficiently strong to hold the hooking stem effectively and not release the hooking stem prematurely (during abrading, for example). The loop fabric may be made by known knitting processes, such as conventional knitting, warp knitting, and stitched loop.

Knitted loop fabrics (such as Guilford 19073, available from the Guilford Mills Company of Greensboro, N.C.) are preferred over woven loop fabrics for several reasons. The former are typically available in finished widths of greater than about 10 cm (4 in), and can be produced at higher production line speeds, and thus at lower unit cost. Loop fabric, because of the method of production used to make it, does not always have projecting loops presented for engagement, and thus a separate manufacturing step must be used to orient the loops. Knitted loop fabrics also tend to give a more uniform and lower loop height than a woven loop fabric. A lower and more uniform loop is desirable because it exhibits a reduced tendency for the attached abrasive article to shift. In addition, higher loop densities are typically attainable with knitted materials than with woven materials. The loops can be knitted in a uniform or homogeneous arrangement, or in a desired pattern, such as a sinusoidal or a random pattern.

The loop fabric is secured to the front face of the support member, typically by an adhesive. For example, a laminating adhesive can be used to secure the loop fabric to the support member. Examples of suitable laminating adhesives include polyolefins, polyesters, polyurethanes, polyamides, phenolic adhesives, urea-formaldehyde adhesives, epoxy adhesives, acrylate adhesives and the like. Alternatively, the loops can be directly bonded to the support member, such as in the case of thermoplastic loops that can be melt bonded to the support member. In another embodiment, the support member can be formed around and bonded to the loop fabric. For instance, a polyurethane material can be foamed directly to the back side of the loop fabric, thereby adhering to the loop fabric.

Figure 11:
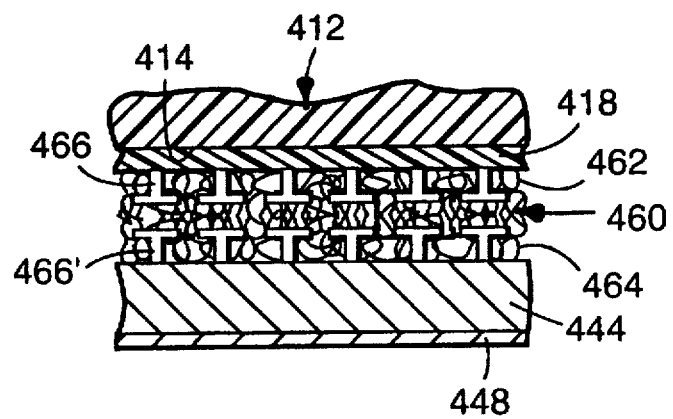
FIG. 11 is a sectional view of the back-up pad, the conversion pad, and the abrasive article of the present invention.

In another embodiment of the back-up pad of the present invention, the engaging surface is provided by a conversion pad 460, as shown in FIG. 11. Conversion pad 460 comprises two opposed faces 462 and 464 each comprising loop fabric, such that the conversion pad may be applied to a back-up pad having hooking stems 466, and may receive on the opposite surface an abrasive article having hooking stems 466'. Preferably, both faces of the conversion pad should include the loop material described above, although the surfaces may comprise different loop materials designed to best engage with the hooking stems of the back-up pad and the abrasive article. As noted previously, not all hooking stems must engage with the loop material to secure the abrasive article to the back-up pad.

The back-up pad of the present invention is preferably used with an abrasive article of the following general design. The abrasive article, although illustrated herein as being circular and flat, could have any desired shape, including but not limited to a circle, an oval, a polygon (such as a rectangle, square, or a star), or a multi-lobed shape (such as a daisy). The abrasive article 444 includes a substrate having hooking stems 446 and an abrasive surface 448 as described in greater detail herein. The abrasive surface 448 may comprise a conventional coated abrasive, a structured abrasive, a nonwoven abrasive, or any other suitable abrasive means. The hooking stems 446 preferably comprise any of the hooking stems described herein.

The back-up pad of the present invention is described in greater detail below with respect to the following Examples and the testing procedure used therein.

EXAMPLES 28–29

Back-up Pad Testing Procedure

An accelerated life test was used to screen various samples of loop fabric for use on the face of the back-up pad. This test subjected experimentally prepared back-up pads (with a loop fabric on the attachment face) to a simulated grinding condition designed to provide an accelerated life test for the abrasive article attachment system between the back-up pad and the abrasive article. The test proceeded until the loop fabric on the back-up pad was unable to hold the abrasive article in place during the abrading process.

In each of the following Examples, the loop fabric was attached to a back-up pad available from the Minnesota Mining and Manufacturing Company of St. Paul, Minn., under the designation Stikit™, part number 5527, using a polyacrylate pressure sensitive adhesive. This method provided a back-up pad having a polyurethane support portion that was directly bonded to the loop fabric.

The test procedure was as follows:

Step 1) A dual action air sander of the type available from National Detroit Inc., of Rockford, Ill., under the designation DAQ, was attached to a programmable robotic arm. The back-up pad was then attached to the DAQ air sander.

Step 2) An abrasive disc with hooking stems was attached to the loop fabric face of the back-up pad using two firm pats of the operator's hand. All tests were made using the same type of abrasive article, which included an abrasive disc having a hooking stem backing layer laminated thereto.

The abrasive disc was of the type available from the Minnesota Mining and Manufacturing Company of St. Paul, Minn., under the designation 3M 255L Grade 80 Stikit™ brand Gold Film abrasive disc. The abrasive disc included a layer of polyacrylate pressure sensitive adhesive on the rear face thereof, to which a backing layer having a plurality of hooking stems was adhered. The hooking stems had a mushroom cap head design, a density of 47 hooking stems per square centimeter (300 per square inch), a stem diameter of 0.43 mm (0.017 inch), were 0.53 mm (0.021 inch) tall, and the head overhung the stem by 0.033 to 0.41 mm (0.013 to 0.016 inch).

Step 3) The abrasive disc was rotated by activating the pneumatic DAQ air sander, with a dynamic air pressure at the tool (the air pressure with the back-up pad allowed to rotate freely) of approximately 42 newtons per square centimeter (60 pounds per square inch). The robotic arm was directed to contact the abrasive face of the rotating abrasive disc onto a flat, 14 gauge steel panel at approximately 30 degree angle between the panel and the plane of the abrasive disc, using about 110 newtons (25 pounds) of downward force. The sanding action was side-to-side for 30 seconds and toward and away from the robotic arm for 30 seconds, at approximately 1 second per sweep. The total sanding time was thus one minute.

Step 4) The abrasive disc was removed from the back-up pad, and reattached to the back-up pad using two firm pats by the operator's hand. The abrasive disc was replaced with a new abrasive disc after every third sanding cycle.

Step 5) Repeated Step 3) and Step 4) until the attachment system between the loop fabric and the hooking stem failed. Failure is defined as the abrasive disc either having less than 50% of the disc contacting the back-up pad, or the disc becoming completely detached during the test.

Each of the following exemplary back-up pads was subjected to the foregoing accelerated life test. The different Examples are described below, and the relative life (as denoted by cycles to failure) is shown in Table One.

Comparative Example A

For Comparative Example A, the loop material adhered to the back-up pad was made in accordance with the disclosure of U.S. Pat. No. 4,609,581 (Ott). The material consists of polyester yarn of 150 denier, with 34 filaments per yarn, stitched into a pattern of about 30 loops per square centimeter. The strength, or tenacity of each filament was approximately 30 grams (1.05 ounces). The basis weight of the material was approximately 77.36 grams per square meter (2.31 ounces per square yard).

Comparative Example B

For Comparative Example B, the loop material adhered to the back-up pad was a napped nylon fiber material available from Guilford Mills, of Greensboro, N.C., under the designation 18904. The material consists of nylon yarn of 40 denier, with 12 filaments per yarn, stitched into a pattern of about 2900 loops per square centimeter. The strength, or tenacity of each filament was approximately 12 grams (0.42 ounces). The basis weight of the material was approximately 97.5 grams per square meter (2.92 ounces per square yard).

Comparative Example C

For Comparative Example C, the loop material adhered to the back-up pad was a knitted nylon fiber material available from APLIX Inc., of Charlotte, N.C., under the designation APLIX 200. The material consists of nylon yarn stitched into a pattern. The strength, or tenacity of each filament was approximately 25 grams (0.875 ounces). The basis weight of the material was approximately 334 grams per square meter (10 ounces per square yard).

Comparative Example D

For Comparative Example D, the loop material adhered to the back-up pad was a knitted nylon fiber material available from Velcro USA Inc., of Manchester, N.H., under the designation 3610. The material consists of nylon yarn of 140 denier stitched into a pattern. The strength, or tenacity of each filament was approximately 20 grams (0.7 ounces). The basis weight of the material was approximately 300 grams per square meter (9 ounces per square yard).

EXAMPLE 28

For Example 28, the loop material adhered to the back-up pad was a knitted nylon 6 fiber material available from Guilford Mills, of Greensboro, N.C., under the designation 19073. The material consists of nylon yarn of 200 denier, with 10 filaments per yarn, stitched into a pattern of about 900 loops per square centimeter. The strength, or tenacity of each filament was approximately 80 grams (2.8 ounces). The basis weight of the material was approximately 334.9 grams per square meter (9.9 ounces per square yard).

EXAMPLE 29

For Example 29, the loop material adhered to the back-up pad was a knitted nylon fiber material available from Kanebo Belltouch Ltd., of Osaka, Japan, under the designation 2A3. The material consists of nylon yarn of 210 denier, with 12 filaments per yarn, stitched into a pattern of about 1765 loops per square centimeter. The strength, or tenacity of each filament was approximately 75 grams (2.625 ounces). The basis weight of the material was approximately 461.2 grams per square meter (13.7 ounces per square yard).

TABLE ONE

| Loop Fabric | Cycles to Failure |
|---|---|
| Comparative Example A | 12–15 |
| Comparative Example B | <1 |
| Comparative Example C | 40 |
| Comparative Example D | 40 |
| Example 28 | 666 |
| Example 29 | >700 |

Thus, the back-up pad of the present invention, as illustrated in Examples 28–29, appears to demonstrate superior durability in the reattachment tests described above.

The back-up pad of the invention can be used in any desired abrading application, such as polishing of ophthalmic lenses, wood and plastic sanding, and heavy stock removal of metal parts. The abrading motion can be a linear motion, random motion, rotary motion, oscillation, random orbital motion, or combinations thereof, and may use tools and machinery known in the abrading field.

The benefits of the inventive abrasive disc are manifold. For example, the abrasive disc of the invention exhibits a decreased tendency to foul due to loose fibers. Also, because no pressure sensitive adhesive is used to attach the abrasive disc to the back-up pad, the risk of fouling the workpiece surface is markedly reduced. Furthermore, the abrasive disc of the invention is adapted for repeated engagement and disengagement from the back-up pad, which results in extended product life compared to lightweight textile discs of the prior art. The abrasive disc of the present invention is less likely to be displaced relative to the opposed surface, such as a back-up pad, during use, and the abrasive article may be more easily removed than conventional PSA discs or textile discs.

The benefits of the inventive method are manifold. For example, the process and apparatus are relatively simple to operate at relatively high speed, yield a relatively low cost abrasive attachment system, provide for an easy conversion to discrete disc form, and provide the potential for low solvent emission.

The present invention further relates to an abrasive article in which a structured abrasive is provided directly onto a substrate having hooking stems, and a method of providing such an abrasive article. The abrasive coating comprises abrasive particles and a binder in the form of a precise, three dimensional abrasive composite molded directly onto the hooking stems substrate on the major surface opposite the hooking stems. The abrading apparatus of the present invention may advantageously employ such a structured abrasive article.

A structured abrasive is a form of an abrasive article in which a substrate bears on a major surface thereof abrasive composites comprising a plurality of abrasive grains dispersed in a binder. The binder serves as a medium for dispersing the abrasive grains, and it may also bind the abrasive composites to the substrate. The abrasive composites have a predetermined three-dimensional shape, e.g., pyramidal. The dimensions of a given shape can be made substantially uniform. Furthermore, the composites are typically disposed in a predetermined array. The predetermined array can be in linear form or matrix form.

Such a structured abrasive article can be prepared by a method generally as follows. A slurry containing a mixture of a binder precursor and a plurality of abrasive grains is applied onto a production tool having cavities which are the negative of the final shape of the abrasive composites. The substrate having first and second major surfaces including the hooking stems on its second major surface is brought into contact with the exposed surface of the production tool such that the slurry wets the first major surface of the substrate to form an intermediate article. Then, the binder is at least partially solidified, cured, or gelled before the intermediate article departs from the exposed surface of the production tool to form a structured abrasive article. The abrasive article is then removed from the production tool and fully cured if it was not fully cured in the previous step. Alternatively, the slurry can be applied onto the first major surface of the substrate and then the production tool can be brought into contact with the first major surface of the substrate.

The precise nature of the abrasive composites provides an abrasive article that has a high level of consistency. This consistency further results in excellent performance. Molding the structured abrasive directly onto the substrate bearing the hooking stems provides time, cost, and material savings. That is, it is unnecessary to mold the structured abrasive onto a substrate which is subsequently bonded to a second substrate bearing the hooking stems. However, it is also contemplated by the present invention to laminate a substrate comprising a structured abrasive coating to a second substrate which includes the hooking stems.

Structured abrasives, and methods and apparatuses for making such structured abrasives, are described in U.S. Pat. No. 5,152,917 (Pieper et al.), issued 6 Oct. 1992, the entire disclosure of which is incorporated herein by reference. Pieper et al. teaches an abrasive article comprising precisely shaped abrasive composites bonded to a conventional backing. The composites comprise abrasive particles and a binder.

Other examples of structured abrasives and methods and apparatuses for manufacture are disclosed in EP 0 554 668 A1 (Calhoun), published 11 Aug. 1993, the entire disclosure of which is incorporated herein by reference. Calhoun teaches an abrasive article comprising precisely spaced and oriented abrasive composites bonded to a conventional backing sheet. The composites comprise abrasive particles dispersed in a binder. Several grades of abrasive particles can be dispersed in each composite, particularly where one grade is above another.

Yet other examples of structured abrasives and methods and apparatuses for manufacture are disclosed in U.S. patent application Ser. No. 08/175,694 issued as U.S. Pat. No. 5,435,819 (Spurgeon et al.), the entire disclosure of which is incorporated herein by reference. Spurgeon teaches a structured abrasive article manufactured with a production tool which allows transmission of radiation energy for curing the binder through the production tool.

Further examples of structured abrasives and methods and apparatuses for manufacture are disclosed in U.S. patent application Ser. No. 08/120,300 (Hoopman et al.), filed 13 Sep. 1993, the entire disclosure of which is incorporated herein by reference. Hoopman teaches a structured abrasive deployed on a sheet-like structure in which not all abrasive composites are identical.

SUBSTRATE

The substrate of this embodiment comprises a first major surface and a second major surface. The first major surface comprises structured abrasive composites bonded directly to the substrate. The second major surface comprises a plurality of hooking stems provided in accordance with any of the embodiments described above. A preferred substrate comprises a plurality of hooking stems as generally illustrated in FIGS. 2b or 2c. Such a substrate is preferably formed in accordance with the embodiment described with respect to FIG. 5. The first major surface of the substrate may be treated prior to bonding the structured abrasive composite to enhance the adhesion of the composite to the substrate. Such treatments are well known in the art, and include, for example corona treatment of the substrate or the application of chemical primers.

ABRASIVE COATING

The abrasive coating of the current invention comprises a plurality of precisely shaped abrasive composites, wherein the abrasive composites comprise a plurality of abrasive particles dispersed in a binder. The binder can bond the abrasive composites to the first major surface of the substrate. The abrasive composite preferably has a discernible precise shape. It is preferred that the abrasive grains do not protrude beyond the planes of the shape before the coated abrasive article is used. As the coated abrasive article is used to abrade a surface, the composite breaks down revealing unused abrasive grains.

The expression "precisely shaped abrasive composite," as used herein, refers to abrasive composites having a shape that has been formed by curing a flowable mixture of abrasive grains and curable binder while the mixture is both being borne on a substrate and filling a cavity on the surface of a production tool. Such a precisely shaped abrasive composite would thus have precisely the same shape as that of the cavity. A plurality of such composites provide three-dimensional shapes that project outwardly from the surface of the substrate in a non-random pattern, namely the inverse of the pattern of the production tool. Each composite is defined by a boundary, the base portion of the boundary being the interface with the substrate to which the precisely shaped composite is adhered. The remaining portion of the boundary is defined by the cavity on the surface of the production tool in which the composite was cured. The entire outer surface of the composite is confined, either by the substrate or by the cavity, during its formation. The abrasive composites can be formed from a slurry comprising a plurality of abrasive grains dispersed in an uncured or ungelled binder. Upon curing or gelling, the abrasive composites are set, i.e., fixed, in the predetermined shape and predetermined array.

The ratio, based on weight, of abrasive grain to binder generally ranges from about 1:1 to 4:1, preferably from about 2:1 to 3:1. This ratio varies depending upon the size of the abrasive grains and the type of binder employed.

Abrasive Particles

The abrasive particles of the abrasive coating typically have a particle size ranging from about 0.1 to 1500 micrometers, preferably between about 0.1 to 400 micrometers and more preferably between 0.1 to 100 micrometers. A narrow distribution of particle size can often provide an abrasive article capable of producing a finer finish on the workpiece being abraded. Examples of such abrasive particles include fused aluminum oxide (which includes brown aluminum oxide, heat treated aluminum oxide, and white aluminum oxide), ceramic aluminum oxide, silicon carbide (including green, white, and black), chromia, alumina zirconia, diamond, iron oxide, ceria, cubic boron nitride, boron carbide, garnet, and combinations thereof The term "abrasive particles" also encompasses when single abrasive particles are bonded together to form an abrasive agglomerate. Abrasive agglomerates are known in the art and are exemplified by U.S. Pat. Nos. 4,311,489 (Kressner); 4,652,275 (Bloecher et al.) and 4,799,939 (Bloecher et al.).

It is also within the scope of this invention to have a surface coating on the abrasive particles. The surface coating may have many different functions. In some instances the surface coatings increase adhesion to the binder, alter the abrading characteristics of the abrasive particle and the like. Examples of surface coatings include coupling agents, halide salts, metal oxides including silica, refractory metal nitrides, refractory metal carbides and the like.

In the abrasive composite there may also be diluent particles. The particle size of these diluent particles may be on the same order of magnitude as the abrasive particles. Examples of such diluent particles include gypsum, marble, limestone, flint, silica, glass bubbles, glass beads, aluminum silicate, and the like.

Binder

The abrasive particles are dispersed in an organic binder to form the abrasive composite coating. The binder must be capable of providing a medium in which the abrasive grains can be distributed. The binder is preferably capable of being cured or gelled relatively quickly so that the abrasive article can be quickly fabricated. Some binders gel relatively quickly, but require a longer time to fully cure. Gelling preserves the shape of the composite until curing commences. Fast curing or fast gelling binders result in coated abrasive articles having abrasive composites of high consistency. The organic binder can be a thermoplastic binder, however, it is preferably a thermosetting binder. The binder is formed from a binder precursor. During the manufacture of the abrasive coating, the thermosetting binder precursor is exposed to an energy source which aids in the initiation of the polymerization or curing process. Examples of energy sources include thermal energy and radiation energy which includes electron beam, ultraviolet light, and visible light. After this polymerization process, the binder precursor is converted into a solidified binder. Alternatively for a thermoplastic binder precursor, during the manufacture of the abrasive article the thermoplastic binder precursor is cooled to a degree that results in solidification of the binder precursor. Upon solidification of the binder precursor, the abrasive composite is formed.

The binder in the abrasive composite is generally also responsible for adhering the abrasive composite to the first major surface of the substrate. However, in some instances there may be an additional adhesive layer between the surface of the substrate and the abrasive composite. This additional adhesive can be selected from the various binders described herein, or may be any other suitable binder.

There are two main classes of thermosetting resins, condensation curable and addition polymerized resins. The preferred binder precursors are addition polymerized resin because they are readily cured by exposure to radiation energy. Addition polymerized resins can polymerize through a cationic mechanism or a free radical mechanism. Depending upon the energy source that is utilized and the binder precursor chemistry, a curing agent, initiator, or catalyst is sometimes preferred to help initiate the polymerization.

Example of typical binders precursors include phenolic resins, urea-formaldehyde resins, melamime formaldehyde resins, acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and mixtures and combinations thereof The term acrylate encompasses acrylates and methacrylates.

Phenolic resins are widely used in abrasive article binders because of their thermal properties, availability, cost and ease of handling. There are two types of phenolic resins, resole and novolac. Resole phenolic resins have a molar ratio of formaldehyde to phenol of at least 1:1, typically from 1.5:1 to 3:1. Novolac resins have a molar ratio of formaldehyde to phenol of less than 1:1. Examples of commercially available phenolic resins include those known by the tradenames "Durez" and "Varcum" from Occidental Chemicals Corp.; "Resinox" from Monsanto; "Aerofene" from Ashland Chemical Co. and "Arotap" from Ashland Chemical Co.

Acrylated urethanes are diacrylate esters of hydroxy terminated NCO extended polyesters or polyethers. Examples of commercially available acrylated urethanes include "UVITHANE 782", available from Morton Thiokol Chemical, and "CMD 6600", "CMD 8400", and "CMD 8805", available from Radcure Specialties.

Acrylated epoxies are diacrylate esters of epoxy resins, such as the diacrylate esters of bisphenol A epoxy resin. Examples of commercially available acrylated epoxies include "CMD 3500", "CMD 3600", and "CMD 3700", available from Radcure Specialities.

Ethylenically unsaturated resins include monomeric or polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically unsaturated compounds preferably have a molecular weight of less than about 4,000 and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

The aminoplast resins have at least one pendant alpha, beta-unsaturated carbonyl group per molecule or oligomer. Examples of such materials include N(hydroxymethyl)-acrylamide, N,N'-oxydimethylenebisacrylamide, ortho and para acrylamidomethylated phenol, acrylamidomethylated phenolic novolac, and combinations thereof These resins are known in the art and are exemplified by U.S. Pat. Nos. 4,903,440 (Larson et al.) and 5,236,472 (Kirk).

Isocyanurate derivatives having at least one pendant acrylate group and isocyanate derivatives having at least one pendant acrylate group are exemplified by U.S. Pat. No. 4,652,274 (Beottcher et al.). The preferred isocyanurate material is a triacrylate of tris(hydroxy ethyl) isocyanurate.

Epoxy resins have an oxirane and are polymerized by the ring opening. Such epoxide resins include monomeric epoxy resins and oligomeric epoxy resins. Examples of some preferred epoxy resins include 2,2-bis[4-(2,3-epoxypropoxy)-phenyl propane] (diglycidyl ether of bisphenol) and commercially available materials under the trade designation "Epon 828", "Epon 1004", and "Epon 1001F" available from Shell Chemical Co., "DER-331", "DER-332", and "DER-334" available from Dow Chemical Co. Other suitable epoxy resins include glycidyl ethers of phenol formaldehyde novolac (e.g., "DEN-431" and "DEN-428" available from Dow Chemical Co.).

The epoxy resins of the invention can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other cationic curing agents include a salt having an organometallic complex cation and a halogen containing complex anion of a metal or metalloid. Such curing agents are known in the art and are exemplified by U.S. Pat. No. 4,751,138 (Tumey et al.) (especially column 6, line 65 to column 9, line 45). Another example known in the art is an organometallic salt and an onium salt as exemplified by U.S. Pat. No. 4,985,340 (Palazzotto) (especially column 4, line 65 to column 14, line 50) and European Patent Applications 306,161 (Brown-Wensley et al.) and 306,162 (Palazzotto et al.). Still other cationic curing agents known in the art include an ionic salt of an organometallic complex in which the metal is selected from the elements of Periodic Group IVB, VB, VIB, VIIB and VIIIB which is described in European Patent Application 109,851 (Palazzotto et al.).

Regarding free radical curable resins, in some instances it is preferred that the abrasive slurry further comprise a free radical curing agent. However in the case of an electron beam energy source, the curing agent is not always required because the electron beam itself generates free radicals.

Examples of free radical thermal initiators include peroxides, e.g., benzoyl peroxide, azo compounds, benzophenones, and quinones. For either ultraviolet or visible light energy source, this curing agent is sometimes referred to as a photoinitiator. Examples of initiators, that when exposed to ultraviolet light generate a free radical source, include but are not limited to those selected from the group consisting of organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. A preferred photoinitiator for use with ultraviolet radiation is 2,2-dimethoxy-1,2-dephenyl-1-ethanone. Examples of initiators known in the art that generate a free radical source when exposed to visible radiation can be found in U.S. Pat. No. 4,735,632, (Oxman et al.). A preferred initiator for use with visible light is "Irgacure 369" commercially available from Ciba Geigy Corporation.

Additives

The abrasive slurry to make the abrasive coating can further comprise optional additives, such as, for example, fillers (including grinding aids), fibers, lubricants, wetting agents, thixoprotic materials, surfactants, pigments, dyes, antistatic agents, coupling agents, release agents, plasticizers, suspending agents, and mixtures thereof. The amounts of these materials are selected to provide the properties desired. The use of these can affect the erodability of the abrasive composite. In some instances an additive is purposely added to make the abrasive composite more erodable, thereby expelling dulled abrasive particles and exposing new abrasive particles.

The term filler also encompasses materials that are known in the abrasive industry as grinding aids. A grinding aid is defined as particulate material that the addition of which has a significant effect on the chemical and physical processes of abrading which results in improved performance. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene; and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, magnesium chloride. Examples of metals include, tin, lead, bismuth, cobalt, antimony, cadmium, iron titanium. Other miscellaneous grinding aids include sulfur, organic sulfur compounds, graphite and metallic sulfides.

Example of antistatic agents include graphite, carbon black, vanadium oxide, humectants, and the like. These antistatic agents are known in the art and are exemplified by U.S. Pat. Nos. 5,061,294 (Harmer et al.); 5,137,542 (Buchanan et al.), and 5,203,884 (Buchanan et al.).

A coupling agent can provide an association bridge between the binder precursor and the filler particles or abrasive particles. The addition of the coupling agent significantly reduces the coating viscosity of the slurry used to form abrasive composites. Examples of coupling agents include silanes, titanates, and zircoaluminates. The abrasive slurry preferably contains anywhere from about 0.01 to 3% by weight coupling agent.

An example of a suspending agent is an amorphous silica particle having a surface area less than 150 meters square/gram that is commercially available from DeGussa Corp., under the trade name "OX-50".

ABRASIVE COMPOSITE SHAPE

Figure 12A:
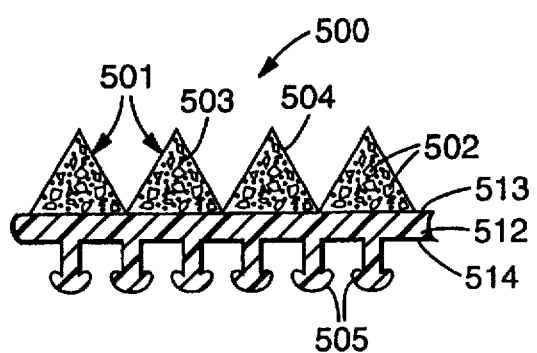
FIGS. 12A and 12B are sectional views of abrasive articles according to alternate embodiments of the present invention.
Figure 12B:
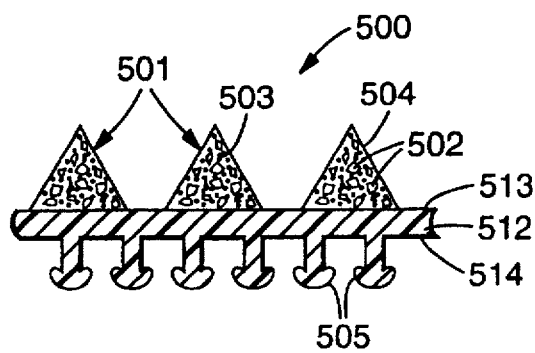

Each abrasive composite has a shape associated with it. The shape has a surface or boundaries associated with it that results in one abrasive composite being separated to some extent from another adjacent abrasive composite. To form an individual abrasive composite, a portion of the planes or boundaries forming the shape of the abrasive composite must be separated from one another. This portion is generally the upper portion. The lower or bottom portion of abrasive composites can abut next to one another. As illustrated in FIG. 12A, adjacent abrasive composites 501 may be separated at the top of the composite and abutted at the bottom surface of the composite. Alternatively, as illustrated in FIG. 12B, adjacent abrasive composites 501 may be completely separated at both the top of the composite and at the bottom surfaces of the composites, leaving spaces between adjacent abrasive composites 501 where the first major surface 513 of the substrate 512 is exposed.

The abrasive composite shape can be any be shape, but it is preferably a three dimensional geometric shape such as a dome, pyramid, truncated pyramid, prism, or a post having any cross section area (i.e., circular, square, rectangle, triangle, octagon, and the like). The resulting abrasive article can have a mixture of different abrasive composite shapes. The preferred shape is a pyramid, having either three or four sides, not counting the base of the pyramid bonded to the substrate. The height of the composites is preferred to be constant across the abrasive article, but is possible to have composites of varying heights.

It is preferred that the abrasive composite shape be precise or predetermined. This precise shape is illustrated in FIGS. 12A and 12B. The abrasive article 500 comprises a substrate 512 including first major surface 513 and second major surface 514. Bonded to the first major surface 513 are a plurality of structured abrasive composites 501. Abrasive composites 501 comprise a plurality of abrasive particles 502 dispersed in a binder 503. In the embodiment illustrated in FIG. 12A, the abrasive composite has a pyramidal shape. The planes or boundaries 504 which define the pyramid are very sharp and distinct. These well defined, sharp planes or shape boundaries 504 give the structured composite 501 a "precise shape" as that term is used herein. The abrasive composite shape can also be relatively inexact, irregular or imperfect.

The abrasive composites have at least one predetermined shape and are disposed in a predetermined array. In general, the predetermined shape will repeat with a certain periodicity. This repeating shape can be in one direction or, preferably, in two directions.

Figure 15:
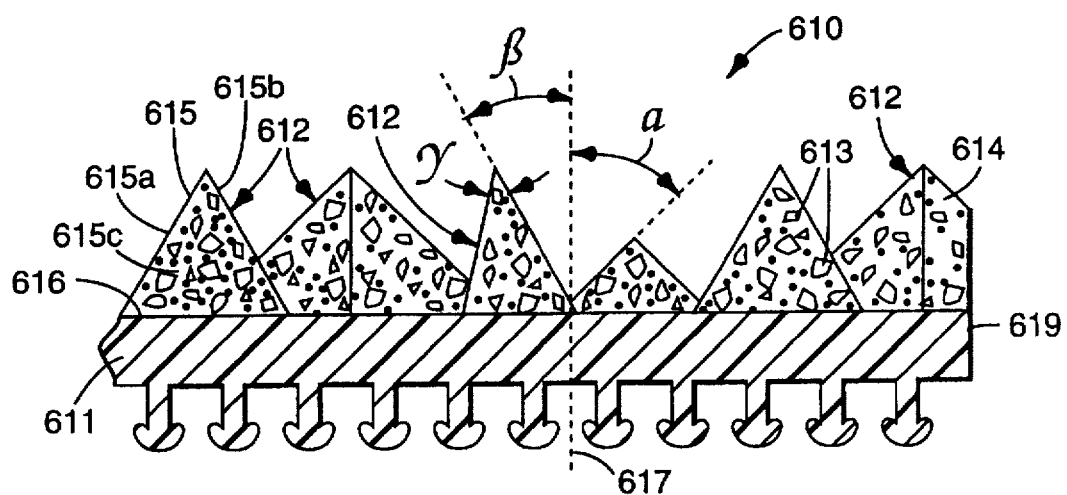
FIG. 15 is a sectional view of an alternate embodiment of the abrasive article of FIG. 12A.
Figure 16:
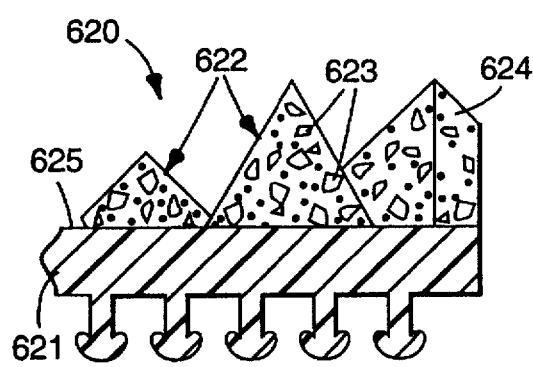
FIG. 16 is a sectional view of another alternate embodiment of the abrasive article of FIG. 12A.

Regarding the construction of such abrasive composites, referring to FIG. 15 for illustrative purposes, the abrasive composite 612 has a boundary 615. Referring to FIG. 16, the abrasive article 620 comprises a backing 621 having a plurality of abrasive composites 622 bonded to the backing. The abrasive composites comprises a plurality of abrasive particles 623 that are dispersed in a binder 624. In this aspect of the invention, there are open spaces 625 between adjacent composites. It is also within the scope of this invention to have a combination of abrasive composites bonded to a backing in which some of adjacent abrasive composites abut, while other adjacent abrasive composites have open spaces between them.

In some instances, e.g., pyramidal non-cylindrical shapes, the boundaries forming the sides of the shape also are planar. For such shapes that have multiple planes, there are at least four planes (inclusive of three sides and the bottom or base). The number of planes for a given shape can vary depending upon the desired geometry, for instance the number of planes can range from four to over 20. Generally, there are between four to ten planes, preferably between four to six planes. These planes intersect to form the desired shape and the angles at which these planes intersect will determine the shape dimensions. Referring to FIG. 15, the abrasive composite 612 has a boundary 615 which is planar. The side planes 615a and 615b intersect at an angle γ, with cross-section 615c facing the viewer and coplanar with the page.

Figure 17:
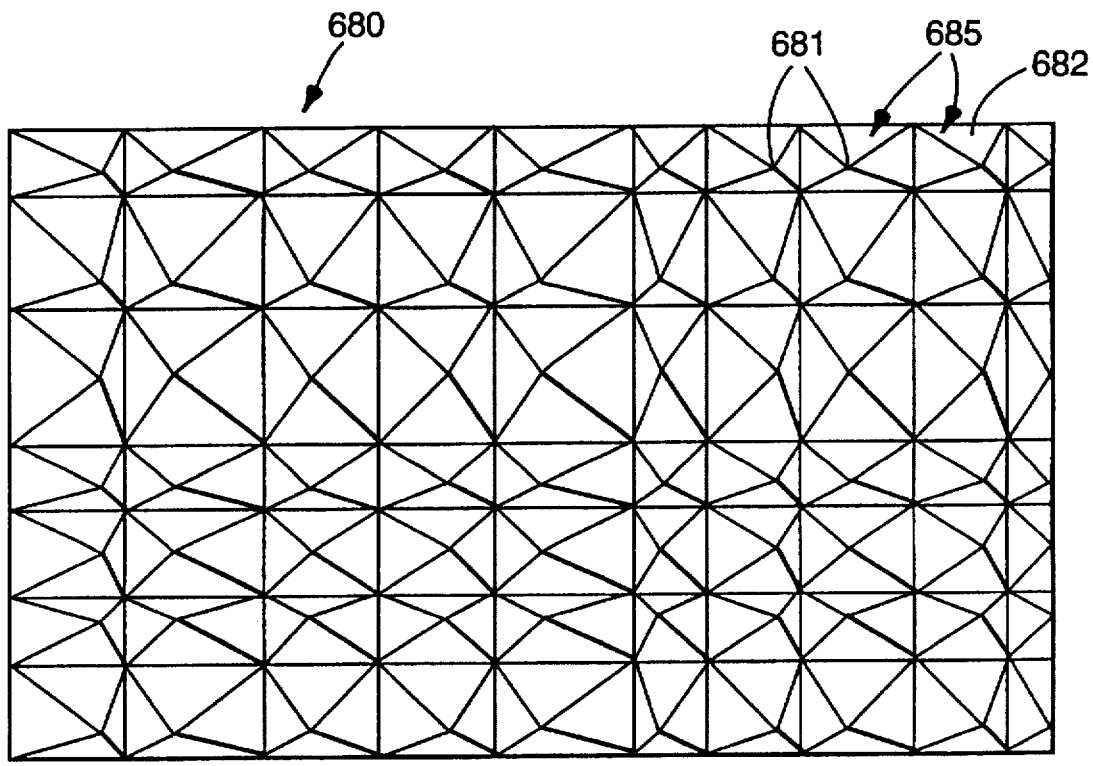
FIG. 17 is a plan view of the abrasive article of FIG. 15.

One aspect of the embodiment of FIGS. 15–17 is that at least one of the abrasive composites has a different dimension from another abrasive composite in the array. Preferably, the different dimension is established between at least one pair of adjacent composites, and even more preferably, established for each and every pair of adjacent composites provided on the surface of the abrasive article. The terminology of "every pair" of adjacent composites encompasses an arbitrary consideration of every composite on the surface of the abrasive article as paired with its adjacent composite. In general, at least 10% of the pairs of adjacent composites have a different dimension therebetween, preferably at least 30%, more preferably at least 50%. Most preferably, substantially 100% of the abrasive composites have a different dimension from its respective paired adjacent abrasive composite. The result of this proviso of different dimensions between abrasive composites, viz. between adjacent pairs of abrasive composites, results in an abrasive article that produces a relatively finer surface finish on the workpiece being abraded or refined. Since the dimensions of adjacent abrasive composites vary, there is a reduced tendency for scribed grooves to be imparted by the precisely abrasive composites into the workpiece surface. In general, if less than 10% of the pairs of abrasive composites have an adjacent composite that has a different dimension, the effect of the invention of decreasing scribing while achieving high-cut rates and fine finishes may not be satisfactorily realized. In general, the number of pairs of adjacent abrasive composites that have different dimensions is selected to minimize or reduce scribing. The percentage of the total abrasive composites that this number of pairs represents will depend upon several factors such as the workpiece type, abrading interface pressure, abrasive article rotation speed and other typical abrading conditions.

More generally, the abrasive composite shape of this invention can be any convenient shape, but it is preferably a three-dimensional regular geometric shape such as a cubic, prismatic (e.g., triangular, quadrilateral, hexagonal, etc.), conical, truncated conical (flat top), cylindrical, pyramidal, truncated pyramidal (flat top) and the like. The geometrical shape of adjacent abrasive composites can be varied, e.g. pyramidal next to prismatic, in order to provide the requisite dimensional variance therebetween. In one embodiment of the invention, the shapes of the abrasive composites, e.g., pyramidal, all are provided with the same total height value, measured from the backing, in a range of from about 50 micrometers to about 1020 micrometers.

A preferred geometrical shape is a pyramid and the pyramid can be a four or five side sided (inclusive of the base) pyramid. In one embodiment, all composite shapes are pyramidal. Even more preferably, the dimensional variance is achieved between adjacent pyramidal-shaped composites by varying the angle formed by a side surface with the substrate in adjacent pyramids. For example, angles $\alpha$ and $\beta$ formed by the sides of adjacent pyramidal shaped composites, such as depicted in FIG. 15, are different angles from each other and each have a value of between 0° and 90° (i.e. non-inclusive of 0° and 90°). Preferably, the angle $\alpha$ or $\beta$ formed between a side surface of the pyramidal-shaped composites and an imaginary plane 617 extending normal to the intersection of the respective side surface and the substrate should be greater than or equal to 8°, but less than or equal to 45°. From a practical standpoint, angles less than 8° may release cured composite shapes from the production tool with greater difficulty. On the other hand, angles greater than 45° may unduly enlarge the spacing between adjacent abrasive composites such that insufficient abrading surfaces are provided over the area of the backing.

It also is preferable to select angles for $\alpha$ and $\beta$ wherein each have a value between 0° and 90° and which differ in magnitude by at least about 1°, and more preferably at least about 5°.

It is also preferred to form pyramidal shapes for the abrasive composites where two side surfaces of each pyramid meet at the apex of each pyramid to form a material-included angle γ (see FIG. 15) in a cross-sectional view of the pyramid having a value of greater than or equal to 25° and less than or equal to 90°. The lower value of 25° may be a practical limit since it can be difficult to form a peak or apex shape for an abrasive composite which is sharp and less than 25° with the slurry and production tool methodology described herein. To more fully realize the benefits of the invention, this proviso with respect to material-included angle γ should be used together with the above-mentioned proviso that intervening angles $\alpha$ and $\beta$ between adjacent composites be provided as different and selected between 0° and 90° as explained herein.

Further, in any individual abrasive composite, the angles made by the various surface planes with the backing do not necessarily have to be the same for a given composite. For instance in a four sided pyramid (one base and three side surfaces), the angles formed by any of the first, second and third side planes with the backing can be different from each other. Naturally, the angle at which the side surfaces intersect with each other will also vary as the angle formed between the side surface and the backing are varied.

In some instances it is preferred to have the height and geometrical shape of all the composites as the same. This height is the distance of the abrasive composite from the substrate to its outermost point before the abrasive article is used. If the height and shape are constant, it is then preferred to have the angle between planes vary. It has been found advantageous to provide pyramidal composites (four sides plus a base) of equivalent height, for example 355 micrometers (0.014 in). Such an array of pyramidal composites can have side angles ($\alpha$ or $\beta$ in FIG. 15) of from 8° to 45°, a material included angle $\gamma$ of at least 25°, and a base width of from 157 to 711 micrometers (0.0062 to 0.028 in). It has also been found advantageous to provide a pyramidal array described as above, except for the following: side angles ($\alpha$ or $\beta$ in FIG. 15) of from 15° to 45°, a material included angle $\gamma$ of at least 60°, and a base width of from 411 to 711 micrometers (0.0162 to 0.028 in).

METHOD OF MAKING THE STRUCTURED ABRASIVE ARTICLE

The first step to make the abrasive coating is to prepare the abrasive slurry. The abrasive slurry is made by combining together by any suitable mixing technique the binder precursor, the abrasive particles and the optional additives. Examples of mixing techniques include low shear and high shear mixing, with high shear mixing being preferred. Ultrasonic energy may also be utilized in combination with the mixing step to lower the abrasive slurry viscosity. Typically, the abrasive particles are gradually added into the binder precursor. The amount of air bubbles in the abrasive slurry can be minimized by pulling a vacuum during the mixing step. In some instances it is preferred to heat the abrasive slurry to a temperature to lower its viscosity as desired. For example, the slurry can be heated to approximately 30° C. to 70° C. However, the temperature of the slurry should be selected so as not to deleteriously affect the substrate to which it is applied. It is important that the abrasive slurry have a rheology that coats well and in which the abrasive particles and other fillers do not settle.

There are two main methods of making the abrasive coating of this invention. The first method generally results in an abrasive composite that has a precise shape. To obtain the precise shape, the binder precursor is at least partially solidified or gelled while the abrasive slurry is present in the cavities of a production tool. The second method generally results in an abrasive composite that has an irregular shape. In the second method, the abrasive slurry is coated into cavities of a production tool to generate the abrasive composites. However, the abrasive slurry is removed from the production tool before the binder precursor is cured or solidified. Subsequent to this, the binder precursor is cured or solidified. Since the binder precursor is not cured while in the cavities of the production tool this results in the abrasive slurry flowing and distorting the abrasive composite shape.

For both methods, if a thermosetting binder precursor is employed, the energy source can be thermal energy or radiation energy depending upon the binder precursor chemistry. For both methods, if a thermoplastic binder precursor is employed the thermoplastic is cooled such that it becomes solidified and the abrasive composite is formed.

Figure 13:
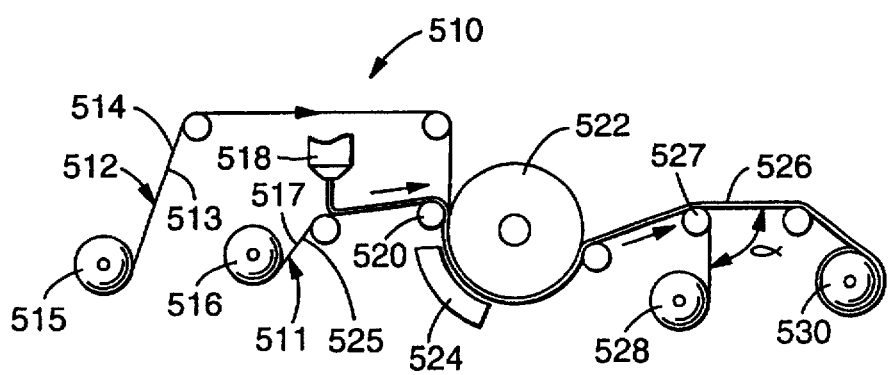
FIG. 13 is a schematic illustration of a fourth apparatus and process for carrying out the method of the present invention.

FIG. 13 illustrates schematically an apparatus 510 for making an abrasive article. A production tool 511 is in the form of a belt having two major surfaces and two ends. A substrate 512 having a first major surface 513 and a second major surface 514 leaves an unwind station 515. At the same time, the production tool 511 leaves an unwind station 516. Second major surface 514 of the substrate comprises hooking stems as disclosed herein. For clarity, such hooking stems are omitted from FIGS. 13–14. The contacting surface 517 of production tool 511 is coated with a mixture of abrasive particles and binder precursor at coating station 518. The mixture can be heated to lower the viscosity thereof prior to the coating step. The coating station 518 can comprise any conventional coating means, such as knife coater, drop die coater, curtain coater, vacuum die coater, or an extrusion die coater. After the contacting surface 517 of production tool 511 is coated, the substrate 512 and the production tool 511 are brought together such that the mixture wets the first major surface 513 of the substrate 512. In FIG. 13, the mixture is forced into contact with the substrate 512 by means of a contact nip roll 520, which also forces the production tool/mixture/backing construction against a support drum 522. It has been found useful to apply a force of 45 pounds with the nip roll, although the actual force selected will depend on several factors as is known in the art. Next, a sufficient dose of energy, preferably radiation energy, is transmitted by a source of radiation energy 524 through the back surface 525 of production tool 511 and into the mixture to at least partially cure the binder precursor, thereby forming a shaped, handleable structure 526. The production tool 511 is then separated from the shaped, handleable structure 526. Separation of the production tool 511 from the shaped, handleable structure 526 occurs at roller 527. The angle a between the shaped, handleable structure 526 and the production tool 511 immediately after passing over roller 527 is preferably steep, e.g., in excess of 30°, in order to bring about clean separation of the shaped, handleable structure 526 from the production tool 511. The production tool 511 is rewound on mandrel 528 so that it can be reused. Shaped, handleable structure 526 is wound on mandrel 530. If the binder precursor has not been fully cured, it can then be fully cured by exposure to an additional energy source, such as a source of thermal energy or an additional source of radiation energy, to form the coated abrasive article. Alternatively, full cure may eventually result without the use of an additional energy source to form the coated abrasive article. As used herein, the phrase "full cure" and the like means that the binder precursor is sufficiently cured so that the resulting product will function as an abrasive article, e.g. a coated abrasive article.

After the abrasive article is formed, it can be flexed and/or humidified prior to converting. The abrasive article can be converted into any desired form such as a cone, endless belt, sheet, disc, etc. before use.

Figure 14:
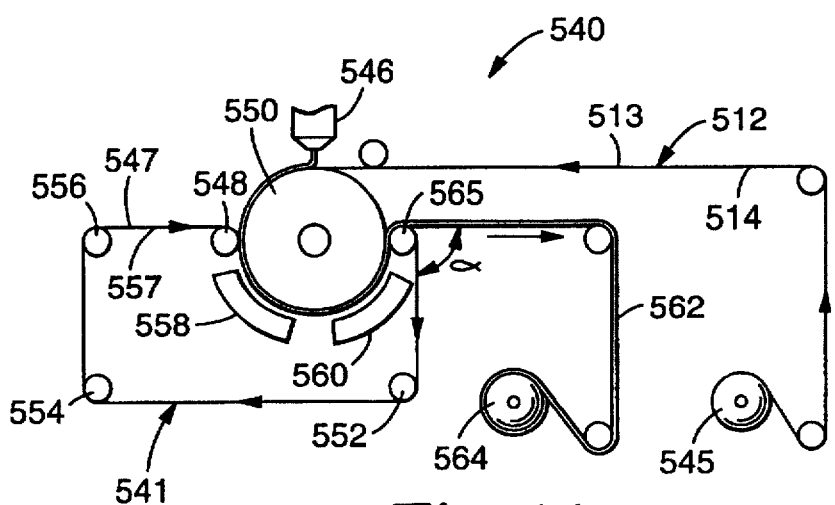
FIG. 14 is a schematic illustration of a fifth apparatus and process for carrying out the method of the present invention.

FIG. 14 illustrates an apparatus 540 for an alternative method of preparing an abrasive article. In this apparatus, the mixture is coated onto the substrate rather than onto the production tool. In this apparatus, the production tool 541 is an endless belt having a front surface and a back surface. A substrate 512 having a first major surface 513 and a second major surface 514 leaves an unwind station 545. The first major surface 513 of the substrate is coated with a mixture of abrasive particles and binder precursor at a coating station 546. The mixture is forced against the contacting surface 547 of the production tool 541 by means of a contact nip roll 548, which also forces the production tool/mixture/backing construction against a support drum 550, such that the mixture wets the contacting surface 547 of the production tool 541. The production tool 541 is driven over three rotating mandrels 552, 554, and 556. Energy, preferably radiation energy, is then transmitted through the back surface 557 of production tool 541 and into the mixture to at least partially cure the binder precursor. There may be one source of radiation energy 558. There may also be a second source of radiation energy 560. These energy sources may be of the same type or of different types. After the binder precursor is at least partially cured, the shaped, handleable structure 562 is separated from the production tool 541 and wound upon a mandrel 564. Separation of the production tool 541 from the shaped, handleable structure 562 occurs at roller 565. The angle a between the shaped, handleable structure 562 and the production tool 541 immediately after passing over roller 565 is preferably steep, e.g., in excess of 30°, in order to bring about clean separation of the shaped, handleable structure 562 from the production tool 541. If the binder precursor has not been fully cured, it can then be fully cured by exposure to an additional energy source, such as a source of thermal energy or an additional source of radiation energy, to form the coated abrasive article. Alternatively, full cure may eventually result without the use of an additional energy source to form the coated abrasive article.

After the abrasive article is formed, it can be flexed and/or humidified prior to converting. The abrasive article can be converted into any desired form such as a cone, endless belt, sheet, disc, etc. before use.

In either embodiment, it is often desired to completely fill the space between the contacting surface of the production tool and the front surface of the backing with the mixture of abrasive particles and binder precursor.

Figure 19:
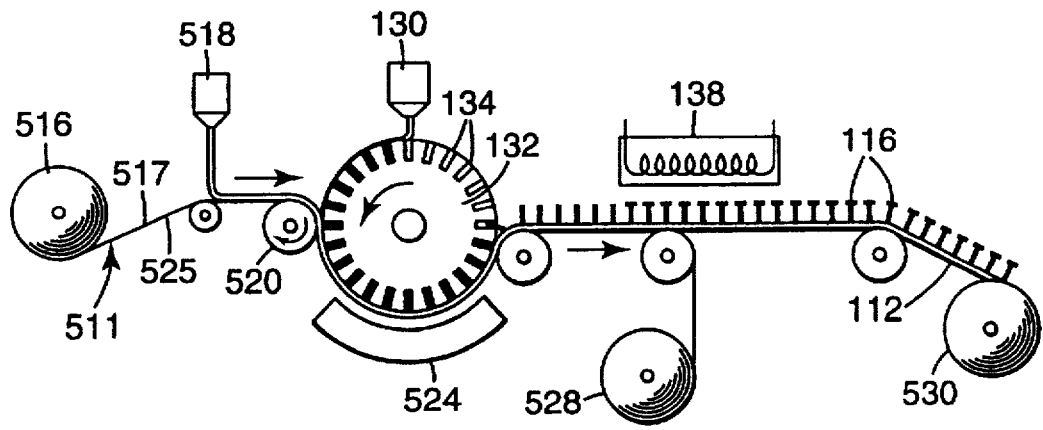
FIG. 19 is a schematic illustration of a sixth apparatus and process for carrying out the method of the present invention.

In the above embodiments, a substrate comprising hooking stems on a surface thereof was provided as a finished component prior to coating the structured abrasive composites onto the substrate. It is also contemplated by the present invention that the coating process can be accomplished simultaneously, or nearly simultaneously, with the step of providing the hooking stems on the substrate as described above. For example, as illustrated in FIG. 19, a substrate 112 having a plurality of hooking stems 116 is provided generally in accordance with the method described with respect to FIG. 5. Extruder 130 extrudes a flowable material onto mold 132. The surface of the mold 132 includes a plurality of arranged cavities 134 for forming hooking stems 116. A sufficient quantity of flowable material is extruded onto mold 132 to form substrate 112 and hooks 116 concurrently. Mold 132 is rotatable and forms a nip along with nip roll 520. Simultaneously, as described with respect to the method illustrated in FIG. 13, production tool 511 leaves unwind station 516. Contacting surface 517 of production tool 511 is coated with a mixture of abrasive particles and binder precursor at coating station 518. The production tool is contacted with the flowable material on mold 132 such that the abrasive particle and binder precursor mixture wets the first major surface of substrate 112 as it is being formed. Next, energy is transmitted by source 524 through the production tool 511 to at least partially cure the binder precursor. At the same time, the flowable material coated on the mold 132 cools and solidifies. Substrate 112 with stems 116 is then separated from mold 132, with the abrasive coating bonded to the second major surface of the substrate. Substrate 112 then passes by heated plate 138 to form heads on the hooking stems 116. Production tool 511 is removed form the substrate and rewound on take-up roll 528 and the coated abrasive article is wound onto take-up roll 530. Alternatively, after the substrate with hooking stems leaves mold 132, it could then be brought into contact with a production tool for depositing the structured abrasive composites as described herein.

Figure 20:
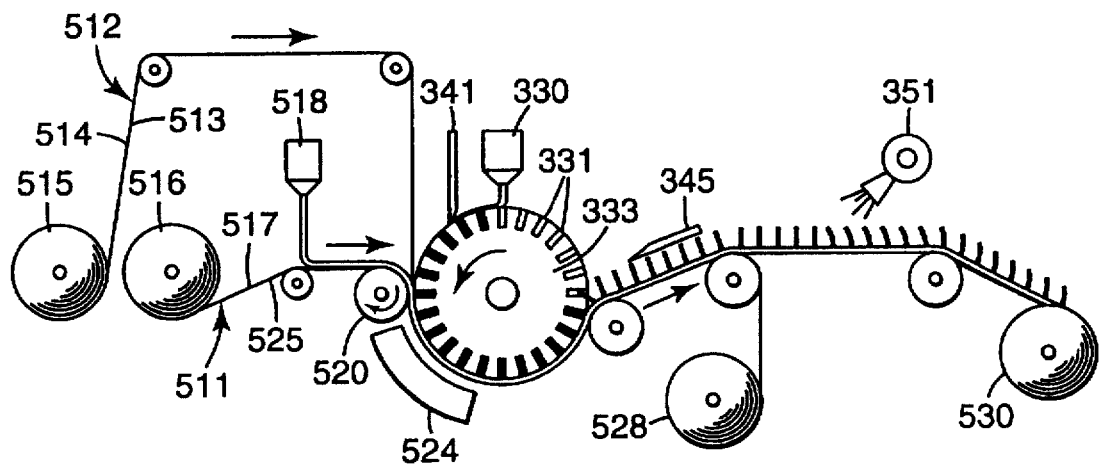
FIG. 20 is a schematic illustration of a seventh apparatus and process for carrying out the method of the present invention.

Similarly, the method of forming hooking stems on a substrate as described with respect to FIG. 7 can be performed simultaneously, or nearly simultaneously, with the method of forming the structured abrasive coating on the substrate. As illustrated in FIG. 20, a substrate 512 is provided, having first major surface 513 and second major surface 514. Flowable material is coated onto print roll 333 by extruder 330. A doctor blade 341 may be provided to contact print roll 333 to ensure an even coating of all of the cavities 331 in print roll 333 and to minimize the amount of material on the surface of the print roll. Substrate 512 is passed through a nip formed between print roll 333 and nip roll 520. The cavities deposit the flowable material onto the second major surface 514 of the substrate 512. Simultaneously, production tool 511 leaves unwind roll 516 and contacting surface 517 of production tool 511 is coated with a mixture of abrasive particles and binder precursor at coating station 518. Production tool 511 also passes through the nip formed between print roll 333 and nip roll 520 such that the abrasive particle and binder mixture contacts the first major surface 513 of substrate 512 while second major surface 514 of substrate 512 contacts the surface of print roll 333. Energy to at least partially cure the binder is imparted by energy source 524. The substrate separates from print roll 333, and flowable material typically extends between the substrate and the print roll in a thread like form to be cut by severing apparatus 345. Air stream 351 can be used to alter the structural features of the hooking stems and to orient the direction of the hooking stems. As a variation of the above, the abrasive coating can be applied to the substrate after the substrate leaves the print roll 333.

In a preferred method of this embodiment, the radiation energy is transmitted through the production tool and directly into the mixture. It is preferred that the material from which the production tool is made not absorb an appreciable amount of radiation energy or be degraded by radiation energy. For example, if electron beam energy is used, it is preferred that the production tool not be made from a cellulosic material, because the electrons will degrade the cellulose. If ultraviolet radiation or visible radiation is used, the production tool material should transmit sufficient ultraviolet or visible radiation, respectively, to bring about the desired level of cure.

The production tool should be operated at a velocity that is sufficient to avoid degradation by the source of radiation. Production tools that have relatively high resistance to degradation by the source of radiation can be operated at relatively lower velocities; production tools that have relatively low resistance to degradation by the source of radiation can be operated at relatively higher velocities. In short, the appropriate velocity for the production tool depends on the material from which the production tool is made. The substrate to which the composite abrasive is bonded should be operated at the same speed as the production tool. The speed, along with other parameters such as temperature and tension, should be selected so as not to deleteriously affect the substrate or the production tool. Substrate speeds of from 9.1 to 18.3 meters/min. (30 to 60 feet/min.) have been found advantageous, however other speeds are contemplated, including speeds of at least 30 meters/min. (100 feet/min.).

A preferred embodiment of an abrasive article provided in accordance with the above-described method is illustrated in FIG. 12A. Abrasive article 510 includes substrate 512 having first major surface 513 and second major surface 514. Second major surface 514 has projecting therefrom hooking stems 505. Hooking stems 505 preferably can be of any of the various hooking stem embodiments described herein.

and more preferably of the type illustrated generally in FIGS. 2b and 2c. Structured abrasive composites 501 are bonded to first major surface 513 of substrate 512. Composites 501 comprise abrasive particles 502 dispersed in binder 503. Surfaces 504 define the precise shapes of the composites 501 as discussed above. As illustrated in FIG. 12A, composites 501 abut one another at their bases. As illustrated in FIG. 12B, the abrasive composites 501 are separated at their bases. An abrasive article may have all or none of its abrasive composites abutting at their base, or may include a mix of abutting and separated abrasive composites 501. The abrasive composites of this embodiment are illustrated as being identical to one another. The composites may instead be of varying height and shape as illustrated in FIGS. 15 and 16 and as discussed above. Alternatively, the abrasive composites may be of identical height and varying shape as discussed above.

Production Tool

The production tool contains a plurality of cavities. These cavities are essentially the inverse shape of the abrasive composite and generate the shape of the abrasive composites. These cavities can have any geometric shape such as the inverse of a dome, pyramid, truncated pyramid, prism, or a post having any cross section area (i.e., circular, square, rectangle, triangle, octagon, and the like). The dimensions of the cavities are selected to achieve this desired number of abrasive composites/square inch. The cavities can be present in a dot like pattern with spaces between adjacent cavities or the cavities can butt up against one another. It is preferred that the cavities butt up against one another. Additionally, the shape of the cavities is selected such that the surface area of the abrasive composite decreases away from the substrate. The production tool can be composed of metal, (e.g., nickel), metal alloys, or plastic. The production tool may also contain a release coating to permit easier release of the abrasive article from the production tool. Examples of such release coatings include silicones and fluorochemicals.

It may be desirable to select a production tool to allow the radiant energy for curing the binder to be transmitted through the production tool. Alternatively, the substrate to which the composite is bonded may allow transmission of the radiant energy therethrough. When the radiation is transmitted through the tool, substrates that absorb radiation energy can be used because the radiation energy is not required to be transmitted through the substrate.

A preferred production tool is described in Spurgeon et al. The production tool can be in the form of a belt, e.g., an endless belt, a sheet, a continuous sheet or web, a coating roll, a sleeve mounted on a coating roll, or die. The surface of the production tool that will come into contact with the mixture is referred to herein as the "contacting surface". If the production tool is in the form of a belt, sheet, web, or sleeve, it will have a contacting surface and a non-contacting surface. If the production tool is in the form of a roll, it will have a contacting surface only. The topography of the abrasive article formed by the method of this invention will have the inverse of the pattern of the contacting surface of the production tool.

Figure 18:
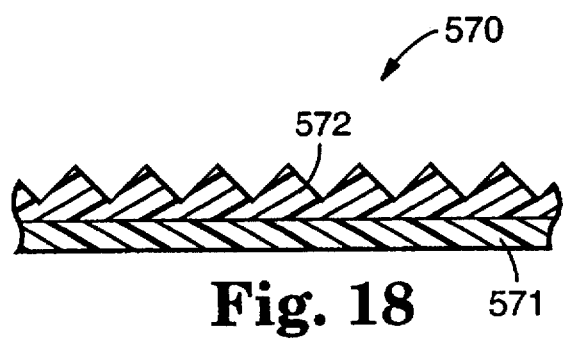
FIG. 18 is a sectional view of a production tool for forming the abrasive article of FIG. 12A.

Thermoplastic materials that can be used to construct the production tool include polyesters, polycarbonates, poly (ether sulfone), poly(methyl methacrylate), polyurethanes, polyvinylchloride, polyolefins, polystyrene, or combinations thereof Thermoplastic materials can include additives such as plasticizers, free radical scavengers or stabilizers, thermal stabilizers, antioxidants, and ultraviolet radiation absorbers. These materials are substantially transparent to ultraviolet and visible radiation. One type of production tool is illustrated in FIG. 18. The production tool 570 comprises two layers 571 and 572. The surface of layer 571 is relatively flat and smooth. The surface of layer 572 has a pattern. Layer 571 exhibits high heat resistance and strength. Examples of materials suitable for layer 571 include polycarbonate and polyester. Layer 572 exhibits low surface energy. The material of low surface energy improves ease of release of the abrasive article from the production tool. Examples of materials suitable for layer 572 include polypropylene and polyethylene. In some production tools made of thermoplastic material, the operating conditions for making the abrasive article should be set such that excessive heat is not generated. If excessive heat is generated, this may distort or melt the thermoplastic tooling. In some instances, ultraviolet light generates heat. It should also be noted that a tool consisting of a single layer is also acceptable, and is the tool of choice in many instances.

A thermoplastic production tool can be made according to the following procedure. A master tool is first provided. The master tool is preferably made from metal, e.g., nickel. The master tool can be fabricated by any conventional technique, such as engraving, hobbing, knurling, electroforming, diamond turning, laser machining, etc. If a pattern is desired on the surface of the production tool, the master tool should have the inverse of the pattern for the production tool on the surface thereof. The thermoplastic material can be embossed with the master tool to form the pattern. Embossing can be conducted while the thermoplastic material is in a flowable state. After being embossed, the thermoplastic material can be cooled to bring about solidification.

The production tool can also be made of a cured thermosetting resin. A production tool made of thermosetting material can be made according to the following procedure. An uncured thermosetting resin is applied to a master tool of the type described previously. While the uncured resin is on the surface of the master tool, it can be cured or polymerized by heating such that it will set to have the inverse shape of the pattern of the surface of the master tool. Then, the cured thermosetting resin is removed from the surface of the master tool. The production tool can be made of a cured radiation curable resin, such as, for example acrylated urethane oligomers. Radiation cured production tools are made in the same manner as production tools made of thermosetting resin, with the exception that curing is conducted by means of exposure to radiation e.g. ultraviolet radiation.

A particularly useful production tool has been prepared by the following method. A master tool made of nickel and having a flat back surface and a front surface having the inverse of the desired surface topography of the production tool was placed on a level surface with the front surface facing up. A dike surrounding the front surface of the master tool was formed by laying appropriate lengths of ¼-inch square steel stock around the edges of the master tool. The dike was bonded to the master tool with a bead of "3M Express" vinyl polysiloxane impression material (Minnesota Mining and Manufacturing Company). An elastomer ("Sylgard #184", Dow Corning Corporation) was catalyzed according to the manufacturer's recommendation and then poured onto the front surface of the master tool in sufficient quantity to give a layer having a depth of ¹⁄₁₆-inch to ⅛-inch. The assembly was allowed to stand at room temperature for eight hours to allow air bubbles to dissipate and a gel to form. The assembly was then moved into an oven and held at a temperature of 49° C. for 24 hours to fix the dimensions of the elastomer. A cure of four hours duration at a temperature of 204° C. provided an elastomer with maximum mechanical strength. After cooling, the elastomeric production tool was separated from the master tool and the edges of the production tool trimmed. The finished elastomeric production tool can then be used to produce abrasive articles according to the method of this invention.

The contacting surface of the production tool may also contain a release coating to permit easier release of the abrasive article from the production tool. Examples of such release coatings include silicones and fluorochemicals.

Energy Sources

When the abrasive slurry comprises a thermosetting binder precursor, the binder precursor is cured or polymerized. This polymerization is generally initiated upon exposure to an energy source. Examples of energy sources include thermal energy and radiation energy. The amount of energy depends upon several factors such as the binder precursor chemistry, the dimensions of the abrasive slurry, the amount and type of abrasive particles and the amount and type of the optional additives. For thermal energy, the temperature can range from about 30° to 150° C., generally between 40° to 120° C. The time can range from about 5 minutes to over 24 hours. The radiation energy sources include electron beam, ultraviolet light, or visible light. Electron beam radiation, which is also known as ionizing radiation, can be used at an energy level of about 0.1 to about 10 Mrad, preferably at an energy level of about 1 to about 10 Mrad. Ultraviolet radiation refers to non-particulate radiation having a wavelength within the range of about 200 to about 400 nanometers, preferably within the range of about 250 to 400 nanometers. It is preferred that 300 to 600 Watt/inch ultraviolet lights are used. Visible radiation refers to non-particulate radiation having a wavelength within the range of about 400 to about 800 nanometers, preferably in the range of about 400 to about 550 nanometers. Other energy sources include infrared and microwave.

EXAMPLES 30–33

The following non-limiting examples will further illustrate the invention. All parts, percentages, ratios, etc., in the examples are by weight unless otherwise indicated. The following abbreviations are used throughout:

| | |
|---|---|
| ASF | amorphous silica filler, commercially available from DeGussa under the trade designation "OX-50"; |
| PH2 | 2-benzyl-2-N,N-dimethylamino-1-(4-morpholinophenyl)-1-butanone, commercially available from Ciba Geigy Corp. under the trade designation "Irgacure 369"; |
| SCA | silane coupling agent, 3-methacryloxypropyl-trimethoxysilane, commercially available from Union Carbide under the trade designation "A-174"; |
| TATHEIC | triacrylate of tris(hydroxy ethyl)isocyanurate; |
| TMPTA | trimethylol propane triacrylate; |
| HAO | heat treated aluminum oxide, grade P-240, commercially available from H.C. Starck GmbH & Co., of Gusler, Germany; |
| KBF$_4$ | potassium tetrafluoroborate, used as a grinding aid. |

A substrate comprising hooking stems integrally formed on its second major surface was provided generally in accordance with the embodiment described with reference to FIG. 5. The substrate comprised a polypropylene copolymer resin commercially available as SRD7-463, available from Shell Chemical Company of Houston, Tex. The hooking stems were approximately 0.64 mm (0.025 in) high from the surface of the substrate to the top of the hooking stem. The stems included a hooking portion generally as that illustrated in FIG. 2c, with the hooking portion extending approximately 0.13–0.18 mm (0.005–0.007 in) radially beyond the stem body. The substrate was approximately 0.13 mm (0.005 in) thick. It is believed that a thicker substrate would make the abrasive article more durable.

The first major surface of the backing was corona discharge treated as is known in the art before applying the abrasive coating. The corona treatment was performed using two electrodes and working at 25° C. The substrate and electrodes were moved relative to on another at a speed of 6 meters/min. delivering 1.7 Joules of energy to the substrate. The abrasive coating was applied to the substrate approximately 20 hours after the corona treatment.

Procedure for Making and Applying the Abrasive Coating

The following general procedure, from the teachings of Pieper et al. and Spurgeon et al., was used for making the structured abrasive coating. First, abrasive slurry was prepared by thoroughly mixing the raw materials as listed in Table 2. All of the ratios are based upon weight.

TABLE 2

| component | part by weight |
|---|---|
| binder: TMPTA/TATHEIC/PH2 (70/30/1) | 24.23 |
| coupling agent: SCA | 0.84 |
| filler: ASF | 0.84 |
| grinding aid: KBF$_4$ | 16.71 |
| abrasive particles: HAO | 57.38 |

The abrasive slurry was coated with a knife coater using a 76 micrometer (0.003 in) gap onto a production tool having a pyramidal type pattern such that the abrasive slurry filled recesses in the tool. The production tool was a belt having a first end and a second end as generally illustrated in FIG. 13. Although not necessary to the present invention, the examples described herein were fabricated to provide a pyramidal pattern in which no two adjacent composites had the same shape as taught by Hoopman et al. The 355 micrometer (0.014 in) high pyramids were four sided (excluding the base) and their bases butted up against one another.

Next, the substrate having hooking stems on the back surface was pressed against the production tool by means of a nip roll and support drum such that the abrasive slurry wetted the front surface of the substrate. The nip roll was maintained at a temperature of 55° C. The pressure between the support drum and nip roll was 45 pounds. The substrate bearing the hooking means was drawn through at a tension of 10 lbs. while the production tool was drawn through at a tension of 15 lbs.

Visible and ultraviolet light, at a dosage of about 236 Watts/cm (600 Watts/inch) produced by 2 "D" bulbs, available from Fusion Systems, was transmitted through the tooling and into the abrasive slurry. Accordingly, the production tool was selected to allow transmission of sufficient radiant energy to cure the binder as is taught by Spurgeon. The radiation initiated the polymerization of the resinous adhesive and resulted in the abrasive slurry being transformed into an abrasive composite and the abrasive composite being adhered to the substrate. The coating and curing of the various examples was performed as shown in Table 3. Next, the abrasive composite construction was separated from the production tool to form an abrasive article.

TABLE 3

| Example | Coating and Curing Speed meters/min. (feet/min.) |
|---|---|
| 30 | 9.14 (30) |
| 31 | 12.19 (40) |
| 32 | 15.24 (50) |
| 33 | 18.29 (60) |

Test Procedure

A structured abrasive coated on a substrate bearing hooking stems on one side thereof was provided as described immediately above. The structured abrasive product was subjected to the three mode test and evaluated as described above with respect to Examples 4-27, with the exception that Grade 3 was further divided into grade 3a wherein which slight puckering is evident and Grade 3b wherein sever edge lifting is evident. The structured abrasive articles were attached to a back-up pad as describe with respect to Examples 4-27, using a knitted nylon fiber loop material available from Guilford Mills under the designation 19073. The results were as follows: for mode 1, a grade of 5; for mode 2, a grade of 5; and for mode 3, a grade of 3a. The results indicate that the bond strength between the abrasive composites and the substrate was adequate and that such an abrasive article would be suitable for use in sanding applications.

Samples of the structured abrasive article was also tested as follows. Offhand sanding was performed using a National Detroit DA sander working on paint panel. The structured abrasive article was found to cut an average of 0.69 grams of paint in 1 minute, and an average 1.9 grams of paint in 3 minutes. There was little signs of shelling, i.e. delamination of abrasive composites from the substrate, during the test. These results also indicate that the bond strength between the abrasive composites and the substrate was adequate and that such an abrasive article would be suitable for use in sanding applications.

Samples were further tested in the so-called Scheifer test as follows. A Scheifer test consists of running a 10 cm (4 in) abrasive disk over a cellulose acetate butylate (CAB) donut workpiece. The abrasive spins at the same speed and in the same direction as the workpiece, but is held in place off center from the workpiece. Ten pounds of weight hold the abrasive disc on the workpiece during sanding. After 500 rotations of the abrasive disc, the amount of material removed from the workpiece and the surface finish of the workpiece are determined. After three samples were so tested, it was found that an average of 0.243 grams was removed from the workpiece in each run. Again, little or no shelling of the abrasive composites from the substrate was observed. These results further indicate that the bond strength between the abrasive composites and the substrate was adequate and that such an abrasive article would be suitable for use in sanding applications.

The present invention has now been described with reference to several embodiments thereof It will be apparent to those skilled in the art that many changes can be made in the embodiments described without departing from the scope of the invention. For example, a layer of adhesive may be applied in the area surrounding the base of the stems, to further facilitate engagement of the abrasive article to an opposed surface. Thus, the scope of the present invention should not be limited to the structures described herein, but rather by the structures described by the language of the claims, and the equivalents of those structures.

What is claimed is:

1. A method of making a coated abrasive article comprising the steps of:
    a) providing a substrate having a first major surface and a second major surface, wherein said second major surface includes a plurality of hooking stems, and wherein said first major surface comprises a material selected from the group consisting of polypropylene and polyethylene;
    b) providing a production tool having a contact surface and a back surface, wherein said contact surface comprises a plurality of cavities, and wherein said contact surface includes a low surface energy material selected from the group consisting of polypropylene and polyethylene;
    c) applying an abrasive coating precursor including a binder and a plurality of abrasive particles onto one of said contact surface of said production tool and said first major surface of said substrate;
    d) positioning said first major surface of said substrate and said contact surface of said production tool to face one another with said abrasive coating precursor therebetween;
    e) while said first major surface of said substrate and said contact surface of said production tool are facing one another with the abrasive coating precursor therebetween, applying sufficient pressure to said second major surface of said substrate and said back surface of said production tool to cause said abrasive coating precursor to wet said first major surface of said substrate and said contact surface of said production tool;
    f) exposing said abrasive coating precursor to conditions such that said abrasive coating precursor is at least partially cured to form an abrasive coating adhered to said first major surface, wherein said abrasive coating comprises a plurality of abrasive composites having a precise shape imparted by said cavities; and
    g) separating said coated abrasive article from said production tool.

2. The method of claim 1, wherein step a) further comprises the steps of:
    i) providing a cylindrical mold having a plurality of stem cavities formed in the peripheral surface thereof, said stem cavities adapted to form said hooking stems; and
    ii) coating a flowable material over the peripheral surface and into said stem cavities to form a substrate including a plurality of hooking stems.

3. The method of claim 2, further including the step of evacuating air from said stem cavities to draw the flowable material into said stem cavities.

4. The method of claim 2, further including the step of continuously cooling said mold to facilitate solidification of said substrate and said hooking stems.

5. The method of claim 2, further comprising the step of providing a head on each hooking stem such that said head extends radially beyond the periphery of the stem in at least one direction.

6. The method of claim 5, wherein said heads are provided by applying heat to said stems.

7. The method of claim 2 further comprising the step of shaping each hooking stem to provide an included distal end angle of less than approximately 90 degrees.

8. The method of claim 1, wherein step a) comprises providing a plurality of stems projecting from said second major surface by the application of a flowable material onto a substrate with a gravure roll.

9. The method of claim 8, further comprising the step of providing a head on each hooking stem such that said head extends radially beyond the periphery of said hooking stem in at least one direction.

10. The method of claim 9, wherein said heads are provided by applying heat to said stems.

11. The method of claim 8, further comprising the step of shaping each hooking stem to provide an included distal end angle of less than approximately 90 degrees.

12. The method of claim 1, wherein step a) further comprises the steps of:
   i) extruding a flowable material through a die opening adapted to provide a substrate having a plurality of parallel rail members projecting therefrom;
   ii) severing said rail members transverse to the longitudinal axis of said rail members; and
   iii) stretching said substrate to space the severed portions of the respective rail members to thereby provide said hooking stems.

13. The method of claim 2, wherein step e is performed concurrently with step ii).

14. The method of claim 2, wherein step e is performed subsequent to step ii).

15. The method of claim 8, wherein step e is performed concurrently with step a).

16. The method of claim 8, wherein step e is performed subsequent to claim a).

17. The method of claim 1 wherein said cavities are disposed in a non-random pattern.

18. The method of claim 1 wherein said abrasive particles comprise material selected from the group consisting of fused aluminum oxide, ceramic aluminum oxide, heat treated aluminum oxide, green silicon carbide, white aluminum oxide, silicon carbide, alumina zirconia, diamond, ceria, cubic boron nitride, garnet, and combinations thereof.

19. The method of claim 1 wherein said binder is capable of being cured by radiation energy.

20. The method of claim 19, wherein step e) comprises exposing said abrasive coating precursor to radiation energy.

21. The method of claim 20, wherein said production tool is capable of transmitting radiation energy.

22. The method of claim 21, wherein step e) comprises exposing said abrasive coating precursor to radiation energy transmitted through said production tool.

23. The method of claim 19 wherein said binder precursor is selected from the group consisting of acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof.

24. The method of claim 23 wherein said binder precursor further comprises a photoinitiator.

25. The method of claim 1 wherein said mixture is applied by means of a coater selected from the group consisting of knife coater, drop die coater, curtain coater, vacuum die coater, and extrusion die coater.

26. The method of claim 21 wherein said production tool is transmissive of ultraviolet radiation.

27. The method of claim 21 wherein said production tool is transmissive of visible radiation.

28. The method of claim 21 wherein said production tool is transmissive of both ultraviolet radiation and visible radiation.

29. The method of claim 21 wherein said production tool comprises a thermoplastic resin, a thermosetting resin, or a radiation-curable resin.

30. The method of claim 21 wherein said source of energy is selected from the group consisting of electron beam, ultraviolet radiation, and visible radiation.

31. The method of claim 21 wherein said substrate is opaque to said radiation energy.

32. The method of claim 1 wherein said production tool comprises an endless belt.

33. The method of claim 1, further comprising the step of:
h fully curing said abrasive coating precursor.

34. The method of claim 33, wherein step h is performed before step g.

35. The method of claim 33, wherein step h is performed subsequent to step g.

36. The method of claim 1, wherein step c) comprises applying said abrasive coating precursor onto said contract surface of said production tool.

37. The method of claim 1, wherein step c) comprises applying said abrasive coating precursor onto said first major surface of said substrate.

38. A method of making a coated abrasive article comprising the steps of:
   a) providing a mold having a plurality of stem cavities formed in the peripheral surface thereof;
   b) coating a flowable material selected from the group consisting of polyethylene and polypropylene over said peripheral surface and into said stem cavities to form a substrate including a plurality of hooking stems, thereby providing a substrate having a first major surface and a second major surface, wherein said second major surface includes a plurality of hooking stems;
   c) providing a production tool having a contact surface and a back surface, wherein said contact surface comprises a plurality of cavities and wherein said contact surface comprises a low surface energy material selected from the group consisting of polypropylene and polyethylene;
   d) applying an abrasive coating precursor including a binder and a plurality of abrasive particles onto one of said contact surface of said production tool and said first major surface of said substrate;
   e) positioning said first major surface of said substrate and said contact surface of said production tool to face one another with said abrasive coating precursor therebetween;
   f) while said first major surface of said substrate and said contact surface of said production tool are facing one another with the abrasive coating precursor therebetween, applying sufficient pressure to said second major surface of said substrate and said back surface of said production tool to cause said abrasive coating precursor to wet said first major surface of said substrate and said contact surface of said production tool;
   g) exposing said abrasive coating precursor to conditions such that said abrasive coating precursor is at least partially cured to form an abrasive coating adhered to said first major surface, wherein said abrasive coating comprises a plurality of abrasive composites having a precise shape imparted by said cavities; and
   h) separating said coated abrasive article from said production tool and from said mold.

39. The method of claim 38, further comprising the step of providing a head on each hooking stem such that said head extends radially beyond the periphery of the stem in at least one direction.

40. The method of claim 39, wherein said heads are provided by applying heat to said stems.

41. The method of claim 38 further comprising the step of shaping each hooking stem to provide an included distal end angle of less than approximately 90 degrees.

42. The method of claim 38, wherein step f) is performed concurrently with step b).

43. The method of claim 38, wherein step f) is performed subsequent to step b).

* * * * *

UNITED STATES PATENT AND TRADEMARK OFFICE
CERTIFICATE OF CORRECTION

PATENT NO.   : 5,785,784
DATED        : July 28, 1998
INVENTOR(S)  : Chesley, Jason A.

Page 1 of 2

It is certified that error appears in the above-identified patent and that said Letters Patent is hereby corrected as shown below:

Column 9,
Line 3, after the word "most" insert the text from line 43 starting with "preferably between 0.25 and 0.76 mm" and through line 66 and lines 1-10 from Column 10.
Line 43, after "stem for too little a" delete "preferably 0.25 and 0.76 mm" through line 66.

Column 10,
Delete lines 1 - 10.

Column 11,
Line 58, insert before "generally" -- present invention --

Column 15,
Line 34, "an" should read -- at --

Column 40,
Line 32, "a" should read -- $\alpha$ --.

Column 41,
Line 12, "a" should read -- $\alpha$ --.

Column 42,
Line 63, "510" should read -- 500 --

Column 49,
Line 19, "e" should read -- e) --
Line 21, "e" should read -- e) --
Line 23, "e" should read -- e) --
Line 25, "e" should read -- e) --

Column 50,
Line 1, "21" should read -- 1 --
Line 9, "h" should read -- h) --
Line 10, "h" should read -- h) --
Line 12, "h" should read -- h) --
Line 11, "h" should read -- g) --
Line 13, "g" should read -- g) --

UNITED STATES PATENT AND TRADEMARK OFFICE
CERTIFICATE OF CORRECTION

PATENT NO.   : 5,785,784
DATED        : July 28, 1998
INVENTOR(S)  : Chesley, Jason A.

It is certified that error appears in the above-identified patent and that said Letters Patent is hereby corrected as shown below:

<u>Column 50 cont'd,</u>
Line 15, "contract" should read -- contact --
Line 21, "of." should read -- of: --

Signed and Sealed this

Twenty-sixth Day of November, 2002

*Attest:*

*Attesting Officer*

JAMES E. ROGAN
*Director of the United States Patent and Trademark Office*